US008913739B2

(12) United States Patent
Golic

(10) Patent No.: US 8,913,739 B2
(45) Date of Patent: Dec. 16, 2014

(54) METHOD FOR SCALAR MULTIPLICATION IN ELLIPTIC CURVE GROUPS OVER PRIME FIELDS FOR SIDE-CHANNEL ATTACK RESISTANT CRYPTOSYSTEMS

(75) Inventor: Jovan Golic, Turin (IT)

(73) Assignee: Telecom Italia S.p.A., Milan (IT)

( * ) Notice: Subject to any disclaimer, the term of this patent is extended or adjusted under 35 U.S.C. 154(b) by 1146 days.

(21) Appl. No.: 12/083,861

(22) PCT Filed: Oct. 18, 2005

(86) PCT No.: PCT/EP2005/011208
§ 371 (c)(1),
(2), (4) Date: Apr. 6, 2009

(87) PCT Pub. No.: WO2007/045258
PCT Pub. Date: Apr. 26, 2007

(65) Prior Publication Data
US 2009/0214025 A1 Aug. 27, 2009

(51) Int. Cl.
*H04L 9/28* (2006.01)
*G06F 7/72* (2006.01)

(52) U.S. Cl.
CPC ............... *G06F 7/725* (2013.01); *G06F 7/721* (2013.01); *G06F 7/728* (2013.01); *G06F 2207/7257* (2013.01); *G06F 2207/7261* (2013.01)
USPC ................. 380/28; 380/29; 380/30; 713/189; 713/194

(58) Field of Classification Search
CPC .. G06F 7/725; G06F 7/728; G06F 2207/7266
USPC ................................ 380/28–30; 713/189, 194
See application file for complete search history.

(56) References Cited

U.S. PATENT DOCUMENTS 5,854,759 A * 12/1998 Kaliski et al. ................. 708/492
6,141,420 A   10/2000 Vanstone et al.

(Continued)

FOREIGN PATENT DOCUMENTS

EP   1 014 617 A3   6/2000
EP   1 160 661 B2   12/2001

(Continued)

OTHER PUBLICATIONS

J. Riley and M. Schulte, "A hardware Accelerator for Elliptic Curve Cryptography over GF(2m)", International Journal of Computer Research—Special Issue on Cryptographic Hardware and Embedded Systems, 2004.*

(Continued)

*Primary Examiner* — Yin-Chen Shaw
(74) *Attorney, Agent, or Firm* — Finnegan, Henderson, Farabow, Garrett & Dunner, L.L.P.

(57) ABSTRACT

A method and device for transforming data with a secret parameter in an elliptic curve cryptosystem based on an elliptic curve defined over an underlying prime field, includes multiplying a point of the elliptic curve; representing the data to be transformed, by a scalar representing the secret parameter, wherein the multiplying includes performing at least one point addition operation and at least one point doubling operation on points of the elliptic curve; providing a representation in affine coordinates of the elliptic curve point to be multiplied and a representation in projective coordinates of intermediate elliptic curve points obtained during the multiplying; performing both the point addition operation and the point doubling operation by means of a sequence of elementary prime field operation types, the elementary prime field operation types including: a first type of prime field operations including field multiplication and field squaring of coordinates of the elliptic curve points and a second type of prime field operations including field addition, field doubling, and field subtraction of coordinates of the elliptic curve points.

14 Claims, 10 Drawing Sheets

(56) References Cited

U.S. PATENT DOCUMENTS

| | | |
|---|---|---|
| 6,212,277 B1 | 4/2001 | Miyaji |
| 6,252,959 B1 | 6/2001 | Paar et al. |
| 6,714,648 B2 | 3/2004 | Miyazaki et al. |
| 6,738,478 B1 | 5/2004 | Vanstone et al. |
| 6,782,100 B1* | 8/2004 | Vanstone et al. ............ 380/28 |
| 6,826,586 B2* | 11/2004 | Chang ..................... 708/491 |
| 6,876,745 B1* | 4/2005 | Kurumatani .............. 380/28 |
| 7,257,709 B2* | 8/2007 | Brown et al. .............. 713/171 |
| 7,904,719 B2* | 3/2011 | Dror et al. ................. 713/174 |
| 2001/0048742 A1 | 12/2001 | Handschuh |
| 2003/0123656 A1 | 7/2003 | Izu et al. |
| 2003/0142820 A1 | 7/2003 | Futa et al. |
| 2003/0156714 A1* | 8/2003 | Okeya ........................ 380/30 |
| 2004/0228478 A1 | 11/2004 | Joye |
| 2004/0247114 A1 | 12/2004 | Joye |
| 2005/0163312 A1 | 7/2005 | Joye et al. |
| 2007/0053506 A1* | 3/2007 | Takashima ................. 380/28 |

FOREIGN PATENT DOCUMENTS

| | | |
|---|---|---|
| EP | 1 217 783 A1 | 6/2002 |
| WO | WO 99/04332 | 1/1999 |
| WO | WO 01/52051 A2 | 7/2001 |
| WO | WO 2007/048430 A1 | 5/2007 |

OTHER PUBLICATIONS

Coron et al., "Resistance against differential power analysis for elliptic curve cryptosystems", Cryptographic Hardware and Embedded Systems—CHES "99, Lecture Notes in Computer Science, vol. 1717, pp. 292-302, 1999.*

Yoon et al.; "Architecture for an Elliptic Curve Scalar Multiplication Resistant to Some Side-channel Attacks", Information Security and Cryptography, ICISC 2003, Lecture Notes in Computer Science, vol. 2971. pp. 139-151, (2003).

Hankerson et al.; "Software Implementation of Elliptic Curve Cryptography over Binary Fields", Cryptographic Hardware and Embedded Systems, CHES 2000, Lecture Notes in Computer Science, vol. 1965, pp. 1-24, (2000).

Trichina et al.; "Implementation of Elliptic Curve Cryptography with Built-In Counter Measures against Side Channel Attacks", Cryptographic Hardware and Embedded Systems, CHES 2002, Lecture Notes in Computer Science, vol. 2523, pp. 98-113, (2002).

Brier et al.; "Weierstraß Elliptic Curves and Side-Channel Attacks", Public Key Cryptography, International Workshop on Practice and Theory in Public Key Cryptography, XP-001068195, pp. 335-345, (2002).

Golic; "A Method for Scalar Multiplication in Elliptic Curve Groups Over Binary Polynomial Fields for Side-Channel Attack-Resistant Cryptosystems", U.S. Appl. No. 12/084,009, filed Apr. 23, 2008.

Okeya et al., "Efficient Elliptic Curve Cryptosystems from a Scalar Multiplication Algorithm with Recovery of the y-Coordinate on a Montgomery-form Elliptic Curve," Cryptographic Hardware and Embedded Systems—CHES 2001, Lecture Notes in Computer Science, vol. 2162, pp. 126-141, (2001).

Fouque et al., "The Doubling Attack—Why Upwards is Better Than Downwards," Cryptographic Hardware and Embedded Systems—CHES 2003, Lecture Notes in Computer Science, vol. 2779, pp. 269-280, (2003).

Kocher et al., "Differential Power Analysis," Advances in Cryptology-Crypto '99, Lecture Notes in Computer Science, vol. 1666, pp. 388-397, (1999).

Kocher; "Timing Attacks on Implementations of Diffie-Hellman, RSA, DSS, and Other Systems," Advances Cryptology-Crypto '96, Lecture Notes in Computer Science, vol. 1109, pp. 104-113, (1996).

Billet, L. et al., "The Jacobi Model of an Elliptic Curve and Side-Channel Analysis," Applied Algebra, Algebraic Algorithms and Error-Correcting Codes, International Symposium AAECC, pp. 34-42, XP001160517, (May 12, 2003).

Chevallier-Mames et al., "Low-Cost Solutions for Preventing Simple Side-Channel Analysis: Slide-Channel Atomicity," IEEE Transactions on Computers, vol. 53(6), pp. 760-768, (2004).

Coron, "Resistance Against Differential Power Analysis for Elliptic Curve Cryptosystems," Cryptographic Hardware and Embedded Systems—CHES '99, Lecture Notes in Computer Science, vol. 1717, pp. 292-302, (1999).

Gebotys, "Design of Secure Cryptography Against the Threat of Power-Attacks in DSP-Embedded Processors," ACM Transactions on Embedded Computing Systems, XP002356343, vol. 3, No. 1, pp. 92-113, (2004).

Gebotys et al., "Secure Elliptic Curve Implementations: An Analysis of Resistance to Power-Attacks in a DSP Processor," Cryptographic Hardware and Embedded Systems—CHES 2002, Lecture Notes in Computer Science, vol. 2523, pp. 114-128, (2002).

Koyama et al., "Speeding up Elliptic Cryptosystems by Using a Signed Binary Window Method," Advances in Cryptology-Crypto '92, Lecture Notes in Computer Science, vol. 740, pp. 345-357, (1993).

* cited by examiner

US 8,913,739 B2

METHOD FOR SCALAR MULTIPLICATION IN ELLIPTIC CURVE GROUPS OVER PRIME FIELDS FOR SIDE-CHANNEL ATTACK RESISTANT CRYPTOSYSTEMS

CROSS REFERENCE TO RELATED APPLICATION

This application is a national phase application based on PCT/EP2005/011208, filed Oct. 18, 2005, the content of which is incorporated herein by reference.

BACKGROUND OF THE INVENTION

1. Field of the Invention

The present invention generally relates to the field of cryptography, particularly to cryptographic methods and devices and, even more particularly, to methods for preventing security attacks to cryptosystems based on information leakage.

2. Description of the Related Art

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section. In modern data communication systems, a wide use of cryptographic techniques providing confidentiality and authenticity of information was enabled by the invention (by W. Diffie and M. Hellman in 1976) of so-called "public-key cryptosystems", which provide efficient solutions to the inherent secret-key management problem.

In particular, public-key cryptosystems are mostly used for Diffie-Hellman key exchange, for digital signatures, and for encrypting secret session keys to be used in secret-key cryptosystems. For example, they are used in the Internet protocols including Secure Socket Layer (SSL), Internet Protocol Security (IPSec), and Pretty Good Privacy (PGP).

Elliptic Curve Cryptosystems (ECCs), proposed independently by V. S. Miller in 1985 and N. Koblitz in 1987, are evolving as an efficient alternative to classical public-key cryptosystems, such as Diffie-Hellman key exchange based on finite field multiplicative groups and RSA, invented by R. L. Rivest, A. Shamir, and L. Adleman in 1978, by offering the same security level for much smaller key sizes, thus allowing for more efficient implementations both in hardware and software.

Typical ECCs include cryptographic protocols Elliptic Curve Diffie-Hellman (ECDH), used for secret key exchange, and Elliptic Curve Digital Signature Algorithm (ECDSA), adopted as international standard ANSI X9.62, used for digital signatures. The protocols are also covered by the IEEE 1363 series of standards.

ECCs are based on mathematical entities called the elliptic curve groups. An elliptic curve group is defined as an Elliptic Curve (EC), which is a set of solutions, called "the points", to an elliptic curve equation, together with an appropriately defined operation among the points on the curve.

The basic two types of ECs are defined over the fields containing a prime number of elements and over the fields with the number of elements being an integer power of 2. The former are also called the prime fields or integer fields or fields of a prime characteristic, their elements are integers, and operations of addition and multiplication are defined modulo a prime number. The latter are also called binary polynomial fields or fields of characteristic 2, their elements are binary polynomials, and operations of addition and multiplication are defined as addition and multiplication of polynomials modulo an irreducible polynomial, respectively.

A prime field, $F_p$, is a finite field with p elements, where p is a prime number. It is composed of a set of integers $\{0, 1, 2, \ldots, p-1\}$, together with the operations of addition and multiplication defined as addition and multiplication of integers modulo p, respectively.

According to the Weierstrass equation, an elliptic curve:

$$E(F_p): y^2 = x^3 + ax + b$$

over $F_p$, $p>3$, specified by two parameters $a,b \in F_p$ satisfying the condition $4a^3 + 27b^2 \neq 0 \bmod p$, is defined as the set of points $P=(x,y)$, $x,y \in F_p$, being the solutions to the equation:

$$y^2 = x^3 + ax + b,$$

together with a special, neutral point O, called the point at infinity. The couple (x,y) represents the x-coordinate and the y-coordinate of a generic point P on an elliptic curve.

An elliptic curve forms a group with respect to the operation, called the addition, which is defined as follows.

Neutral point: $P+O=O+P=P$ for all $P=(x,y) \in E(F_p)$.

Negative point: If $P=(x,y) \in E(F_p)$, then $(x,y)+(x,-y)=O$, and $(x,-y) \in E(F_p)$ is denoted as $-P$ and is called the negative of P.

Addition of points: Let $P=(x_1,y_1) \in E(F_p)$ and $Q=(x_2,y_2) \in E(F_p)$, where $P \neq \pm Q$. Then $P+Q=(x_3,y_3)$, where:

$$x_3 = \lambda^2 - x_1 - x_2,$$
$$y_3 = \lambda(x_1 - x_3) - y_1,$$
$$\lambda = \frac{y_2 - y_1}{x_2 - x_1}.$$

Doubling of a point: Let $P=(x_1,y_1) \in E(F_p)$, where $P \neq O$. Then $P+P=2P=(x_3,y_3)$, where:

$$x_3 = \lambda^2 - 2x_1,$$
$$y_3 = \lambda(x_1 - x_3) - y_1,$$
$$\lambda = \frac{3x_1^2 + a}{2y_1}.$$

Consequently, the addition of points can be performed as a sequence of multiplications, squaring operations, subtractions, and inversions over $F_p$, whereas the doubling of a point can be performed as a sequence of multiplications, squaring operations, subtractions, additions, doublings, and inversions over $F_p$.

In order to avoid the burden of computing the inversion, which is typically much more complex than computing the other operations in $F_p$, an elliptic curve point can be represented by the so-called "projective coordinates" instead of the classical, "affine coordinates".

For a point P given in affine coordinates as $P=(x_a, y_a)$, the representation in projective coordinates is given as $P=(x_p, y_p, z_p)$, where $(x_p, y_p, z_p) = (\lambda \cdot x_a, \lambda \cdot y_a, \lambda)$ and $\lambda \neq 0$ is arbitrary. The projective coordinates are thus not unique. The conversions between the coordinates are performed by the following formulas:

$$(x_a, y_a) \to (x_a, y_a, 1) = (x_p, y_p, z_p),$$

$$(x_p, y_p, z_p) \to \left(\frac{x_p}{z_p}, \frac{y_p}{z_p}, \frac{z_p}{z_p}\right) = (x_a, y_a, 1) \to (x_a, y_a).$$

The projective coordinates are convenient to represent the neutral point by $z_p=0$, for example, as $(1, 1, 0)$.

It is known that the point addition and doubling in projective coordinates can be performed by using the following formulas (as described for example in K. Koyama and Y. Tsuruoka, "Speeding up elliptic cryptosystems by using a signed binary window method," Advances in Cryptology—Crypto '92, Lecture Notes in Computer Science, vol. 740, pp. 345-357, 1993).

Addition of $P=(x_1,y_1,z_1)$ and $Q=(x_2,y_2,z_2)$ into $P+Q=(x_3, y_3, z_3)$: $u_1=y_2z_1-y_1$, $z_2$, $u_2=x_2z_1-x_1z_2$, $u_3=x_2z_1+x_1z_2$, $u_4=u_1{}^2z_1z_2-u_2{}^2u_3$, $x_3=u_2u_4$, $y_3=u_1(u_2{}^2x_1z_2-u_4)-u_2{}^3y_1z_2$, $z_3=u_2{}^3z_1z_2$.

Doubling of $P=(x_1,y_1,z_1)$ into $2P=(x_3,y_3,z_3)$: $u_1=y_1z_1$, $u_2=3x_1{}^2+az_1{}^2$, $u_3=y_1u_1$, $u_4=x_1u_3$, $u_5=u_2{}^2-8u_4$ $x_3=2u_1u_5$, $y_3=u_2(4u_4-u_5)-8u_3{}^2$, $z_3=8u_1{}^3$.

Differently from the point addition and doubling in affine coordinates, the formulas in projective coordinates do not include the inversion, so this costly operation is avoided, but the number of multiplications is increased.

Accordingly, to perform a sequence of point additions and/or doublings in projective coordinates, the inversions need to be computed only at the end, when the projective coordinates are converted back to the affine coordinates.

In particular, it is known, as for example described in U.S. Pat. No. 6,714,648 B2, that the inversion in any finite field can be implemented as an exponentiation, in view of the fact that in a field with q elements it is true that $x^{-1}=x^{q-2}$.

There are also other known coordinate systems for achieving the same objective, such as the so-called Jacobian and Chudnovsky coordinates, or combinations thereof. Typically, the number of multiplications for the point doubling can thus be reduced, at the expense of further increasing the number of multiplications for the point addition.

The main operation over elliptic curve groups that is required for cryptosystems such as ECDH or ECDSA is a repeated addition of a generic point P with itself k−1 times, P+ . . . +P, an operation called the "scalar multiplication" of a base point P by a scalar k and is denoted as kP, where k is a positive integer. In practical applications, k is a secret and very big number, typically, several hundred bits long. The base point P can be selected according to the criteria specified in the cryptosystems ECDH and ECDSA.

The scalar multiplication can be computed efficiently by using an algorithm called "double-and-add", in the left-to-right (i.e., going from the most significant bit of k downwards) or right-to-left (from the least significant bit of k upwards) manner, where $$k = (k_{t-1}, k_{t-2}, \ldots, k_1, k_0)_2 = \sum_{i=0}^{t-1} k_i 2^i.$$

The algorithm consists of a series of point doublings and point additions, where the positions of point additions depend on the scalar k. More precisely, the algorithm consists of t iterations, each iteration consisting of a point doubling that is followed by a point addition only if the corresponding scalar bit is equal to 1.

It is known in the art that if a cryptographic algorithm, such as, for example an ECC, is implemented on a microelectronic device, e.g., an integrated circuit chip card, then even for tamper-resistant chips, where the underlying integrated circuit is protected by special physical measures, such as protective layers and various sensors and detectors, the sensitive information, dependent on the underlying secret or private key, being processed during the execution of the cryptographic algorithm may leak out through various side channels, for example, through measurements of the timing, power consumption, and electromagnetic radiation, as well as monitoring of signals by micro-probing. The objective of these "side-channel" attacks is to recover the secret key by using the information leaking out from said side channels.

In particular, the timing attacks were introduced by P. Kocher, in "Timing attacks on implementations of Diffie-Hellman, RSA, DSS, and other systems", Advances in Cryptology—Crypto '96, Lecture Notes in Computer Science, vol. 1109, pp. 104-113, 1996; the power analysis attacks were introduced by P. Kocher, J. Jaffe, and B. Jun, in "Differential power analysis," Advances in Cryptology—Crypto '99, Lecture Notes in Computer Science, vol. 1666, pp. 388-397, 1999.

The two basic power analysis attacks are Simple Power Analysis (SPA) attacks and Differential Power Analysis (DPA) attacks. An SPA attack utilizes a single power consumption curve and tries to deduce information about the secret key from this curve, whereas a DPA attack utilizes a set of power consumption curves, guesses a part of the secret key, and then verifies if the guess is correct by a simple processing of the curves according to the corresponding guess. The timing attacks can utilize single or multiple measurements.

The timing and power analysis attacks do not require expensive resources, and most implementations, without specific countermeasures incorporated therein, are vulnerable to them. Therefore, there is a need to protect the sensitive data from side-channel attacks by appropriate changes in the cryptographic algorithm, of course, without changing the overall functionality of the algorithm.

A problem with a direct implementation of the double-and-add algorithm for performing the scalar multiplication is that the computations required for the point addition and the point doubling in general are different (for example, the two operations may differ in the total numbers of field multiplications and/or of squaring operations required). As a consequence, the timing, as well as the power consumption of a hardware device implementing the cryptographic algorithm significantly depend on the secret scalar k. Thus, the double-and-add algorithm is potentially vulnerable to the timing attack and SPA attack: by analyzing the timing and/or the power consumption curve it may be possible to identify the iterations where the point addition is effectively performed, that is, when the scalar bit is equal to 1, and thus reconstruct the secret scalar.

One known way of dealing with this problem is to modify the basic double-and-add algorithm by introducing a dummy point addition whenever the corresponding scalar bit is equal to 0, which results in the so-called "double-and-add-always" algorithm or, possibly, to perform other algorithms, as sequences of point doublings, additions, and subtractions, which are different from the double-and-add algorithm in that they have a more balanced timing and power consumption. Typically, the modified or new algorithms require a considerable increase of the total computation time needed.

A different approach aims at balancing the computations required for the point addition and point doubling themselves. For example, C. H. Gebotys and R. J. Gebotys, in "Secure elliptic curve implementations: An analysis of resistance to power-attacks in a DSP processor," Cryptographic Hardware and Embedded Systems—CHES 2002, Lecture Notes in Computer Science, vol. 2523, pp. 114-128, 2002, suggest to work in the Jacobian coordinates and to represent the sequence of field operations required for the point addition as a sequence of operations required for the point doubling (with different operands) repeated twice, which makes it difficult to identify the iterations when the scalar bit is equal to 1. This was achieved for a specific case a=−3 mod p, by introducing some dummy elementary operations and by an appropriate reordering of the elementary operations.

Another method of a similar type, also dealing with the Jacobian coordinates, but in a general case when the parameter a can take any value, is proposed by B. Chevallier-Mames, M. Ciet, and M. Joye, in "Low-cost solutions for preventing simple side-channel analysis: Side-channel atomicity," IEEE Transactions on Computers, vol. 53 (6), pp. 760-768, 2004. In this method, the point addition and point doubling are balanced by representing each of them as a sequence of elementary (atomic) blocks of operations, which themselves are assumed to be indistinguishable with respect to side-channel attacks. Each atomic block can be represented as the same sequence of field operations (one multiplication, two additions, and one negation) and some pointer update instructions. One pointer determines the iteration index, while the others determine the indexes of the register variables within each iteration.

US 2003/0123656 A1 discloses two scalar multiplication algorithms of the double-and-add-always type in which the point addition and doubling can be performed simultaneously at the expense of introducing some auxiliary variables. In addition, a number of techniques for the point addition and doubling are also proposed. The points are represented in projective coordinates, and the point addition and point doubling can be performed by using only the x and z coordinates, whereas the y coordinate can be recovered at the end by an appropriate algorithm without the inversion operation.

U.S. Pat. No. 6,212,277 B1 describes a technique for transforming an original elliptic curve over a prime field into an isomorphic curve for which the parameter a is much smaller, if possible equal to −3 mod p, so that the computations, in the Jacobian coordinates, can be somewhat simplified. The Applicant observes that resistance to side-channel attacks is not discussed.

US 2003/0142820 A1 deals with the elliptic curves given in the so-called Montgomery form, $By^2=x^3+Ax^2+x$, which enables a somewhat faster scalar multiplication by using the Montgomery ladder algorithm. The points are represented in affine or projective coordinates and only the x (or x and z) coordinates are being computed. The document describes several improvements and/or modifications to these algorithms including an algorithm for recovering the y coordinate at the end of computations.

Yet another known method is to randomize the scalar multiplication algorithm by randomizing the elliptic curve in question, the base point, the coordinates, and/or the secret scalar itself, without changing the final result. This also helps counteracting the DPA attack, in addition to the timing attack and SPA attack.

In particular, it is suggested by P. Kocher, in "Timing attacks on implementations of Diffie-Hellman, RSA, DSS, and other systems," Advances in Cryptology—Crypto '96, Lecture Notes in Computer Science, vol. 1109, pp. 104-113, 1996, to randomize the scalar by adding to it a random integer multiple of the base point order, n, in view of kP=kP+rnP= (k+rn)P. More precisely, this was suggested by using the multiplicative instead of additive terminology for a group operation, in which the exponentiation is an analog of the scalar multiplication.

J.-S. Coron suggested in "Resistance against differential power analysis for elliptic curve cryptosystems," Cryptographic Hardware and Embedded Systems—CHES '99, Lecture Notes in Computer Science, vol. 1717, pp. 292-302, 1999, that a 20-bit random number r may be sufficient, but it was later shown by P.-A. Fouque and F. Valette, in "The doubling attack—Why upwards is better than downwards," Cryptographic Hardware and Embedded Systems—CHES 2003, Lecture Notes in Computer Science, vol. 2779, pp. 269-280, 2003, that under some conditions this is not sufficiently secure, especially if the bit-size of r is relatively small and if one can distinguish the point addition from the point doubling.

Another technique for randomizing the scalar consists in splitting the scalar in two random parts by using the integer addition modulo n, according to $k=k_1+k_2$ mod n, and then to compute $kP=k_1P+k_2P$. An example of such a technique combined with the representation of points in the Jacobian coordinates is proposed in EP 1,217,783 A1.

SUMMARY OF THE INVENTION

The Applicant found that the known implementations of ECCs may not be sufficiently efficient or sufficiently secure against side-channel attacks.

In respect of the proposal by C. H. Gebotys and R. J. Gebotys to work in the Jacobian coordinates, the Applicant observes that the authors did not point out the fact that when the base point is given in affine coordinates, the expressions for point addition simplify as the third coordinate is equal to 1, which induces an imbalance between the point addition and doubling. So, the base point has to be given in the Jacobian coordinates, with the third coordinate different from 1 and possibly randomly generated. The method specifically applies to the case a=−3 mod p and does not discuss how the field operations are performed.

The proposal of B. Chevallier-Mames, M. Ciet, and M. Joye is more general, as the parameter a can take any value. The two sequences for the point addition and point doubling maintain different lengths, and the balancing is achieved by introducing a large number of dummy field additions and pointer update instructions. The Applicant observes that the pointer update instructions may be a source of information leakage, as it may be possible to distinguish whether a pointer changes its value or not. Similarly as above, the base point has to be given in the Jacobian coordinates with the third coordinate different from 1 and possibly randomly generated.

Concerning US 2003/0123656, the Applicant observes that the technique disclosed therein provides certain resistance to the timing and SPA attacks and reduces the computational time, but not the computational cost. The Applicant also observes that the two proposed algorithms are essentially minor variations of the well-known double-and-add-always algorithm and the algorithm known as the Montgomery ladder, respectively. The other proposed techniques for the point addition and doubling involve sequences of elementary operations that are not balanced.

In U.S. Pat. No. 6,212,277 B1, resistance to side-channel attacks is not discussed.

In connection with US 2003/0142820 A1, the Applicant observes that side-channel attack resistance is not considered; also, the algorithm for recovering the y coordinate was previously proposed by K. Okeya and K. Sakurai, in "Efficient elliptic curve cryptosystems from a scalar multiplication algorithm with recovery of the y-coordinate on a Montgomery-form elliptic curve", Cryptographic Hardware and Embedded Systems—CHES 2001, Lecture Notes in Computer Science, vol. 2162, pp. 126-141, 2001.

In view of the state of the art outlined in the foregoing, the Applicant tackled the general problem of increasing the security of cryptosystems, particularly of ECCs, and even more particularly of ECCs defined over prime fields, against side-channel attacks, by finding alternative solutions, possibly more general and/or more efficient than the existing ones.

Even more particularly, the Applicant faced the problem of increasing the security against certain types of side-channel attacks, like timing and simple power analysis attacks, of the operations of scalar multiplication of a generic point of an elliptic curve by a scalar (the secret parameter), such operations being quite common in ECCs, and possibly being implemented as double-and-add operations.

The Applicant found that a convenient way to perform the double-and-add (or other similar) operations in a secure way is to exploit projective coordinates, as the computational complexities of the point addition and point doubling are then more balanced. So, there is no need to work in the Jacobian coordinates and to represent the base point in the Jacobian coordinates, with the third coordinate different from 1 and possibly randomly generated. In particular, the starting observation of the Applicant was that when the point addition in the basic double-and-add algorithm is performed in mixed coordinates, i.e., when the base point is given in affine coordinates and the intermediate points in projective coordinates, then the number of field multiplications required for point addition and point doubling are nine and seven, respectively, whereas the number of field squaring operations required for point addition and point doubling are two and five, respectively, so that point addition and point doubling are imbalanced. Besides, a number of field subtractions, field additions, and field doublings are also required, but they have a much smaller computational cost than multiplications and squaring operations.

The Applicant introduced a reasonable assumption that, from the viewpoint of a side-channel attacker, it is hard to distinguish between a squaring and a multiplication as well as among an addition, a subtraction, and a doubling in the underlying prime field. Under this assumption, the Applicant found that by introducing a small number of dummy field operations, in particular, one dummy field multiplication and three dummy field additions in the point addition, the sequences of elementary field operations for the point addition and point doubling can be made balanced, thus achieving a desired resistance against the timing and SPA attacks.

According to an embodiment of the present invention, the Applicant devised balanced algorithms for the point addition in mixed coordinates and for the point doubling in projective coordinates. In a preferred embodiment of the present invention, the two algorithms are perfectly balanced, as sequences of elementary field operations, on the condition that it is practically impossible to distinguish between a squaring and a multiplication, as well as among an addition, a subtraction, and a doubling in the underlying prime field. It is pointed out that these assumptions are realistic, especially for hardware implementations, provided that the additions, subtractions, and multiplications in the prime field are properly performed. For example, a suitable way for performing the multiplication is the Montgomery algorithm for modular multiplication of integers, introduced by P. L. Montgomery in 1985.

By using the proposed balanced algorithms, it is possible to perform the scalar multiplications included in many cryptographic algorithms based on ECs in a more secure way, resistant at least to certain types of side-channel attacks. In particular, the proposed balanced algorithms for the point addition and point doubling are useful for performing the scalar multiplication by the double-and-add type of algorithm, but are not limited to this: they can more generally be used in any scalar multiplication algorithm defined as a sequence of point doublings, additions, and subtractions.

According to a preferred embodiment of the present invention, in order to render the scalar multiplication even more secure, particularly to achieve a practical resistance against the DPA attacks as well as to prevent the intrinsic leakage of the scalar Hamming weight (i.e., the total number of 1's in the binary representation of the scalar) in the double-and-add type of algorithm, the proposed balanced algorithms may be used along with a randomization of the scalar based on a sufficiently large random number (e.g. 32 to 128 bits long), depending on the desired security level.

According to an aspect of the present invention, a method is provided for transforming data with a secret parameter in an elliptic curve cryptosystem based on an elliptic curve defined over an underlying prime field.

The method comprises multiplying a point of the elliptic curve, representing the data to be transformed, by a scalar representing the secret parameter, wherein said multiplying includes performing at least one point addition operation and at least one point doubling operation on points of the elliptic curve.

A representation in affine coordinates of the elliptic curve point to be multiplied and a representation in projective coordinates of intermediate elliptic curve points obtained during said multiplying are provided.

Then, both said point addition operation and said point doubling operation are performed by means of a sequence of elementary field operation types, said elementary field operation types including:
  a first type of prime field operations including field multiplication and field squaring of coordinates of the elliptic curve points, and
  a second type of prime field operations including field addition, field doubling, and field subtraction of coordinates of the elliptic curve points.

According to a second aspect of the present invention, a device is provided for transforming data with a secret parameter, comprising an integrated circuit adapted to perform the above mentioned method.

BRIEF DESCRIPTION OF THE DRAWINGS

The features and advantages of the present invention will be made apparent by the following detailed description of some embodiments thereof, provided merely by way of non-limitative examples, description that will be carried out making reference to the attached drawings, wherein.

DETAILED DESCRIPTION OF THE PREFERRED EMBODIMENT(S)

Figure 1A:
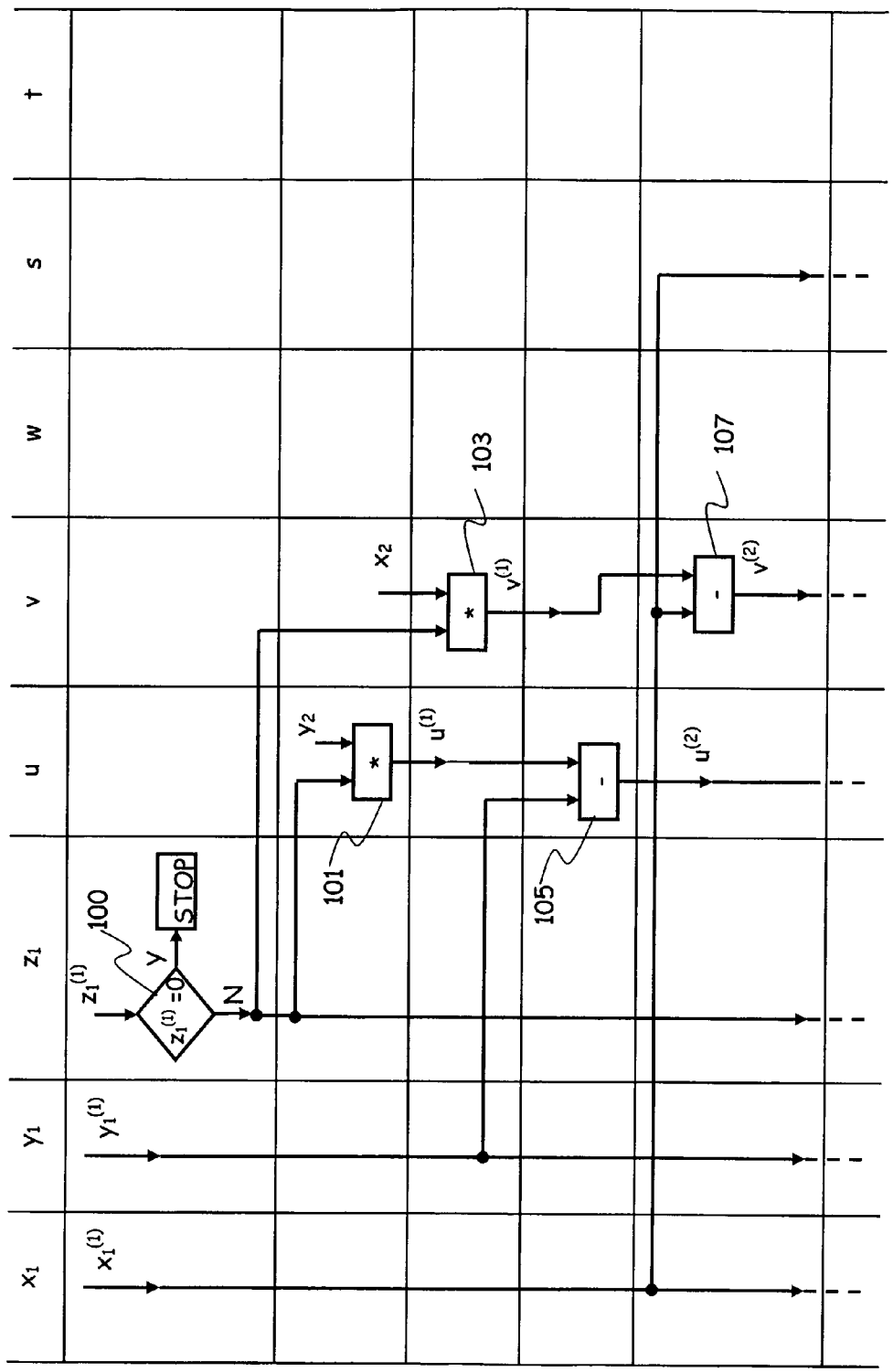
FIGS. 1A to 1D show a schematic block diagram of a structure adapted to implement an algorithm for point addition in mixed coordinates, according to an embodiment of the present invention.
Figure 1B:
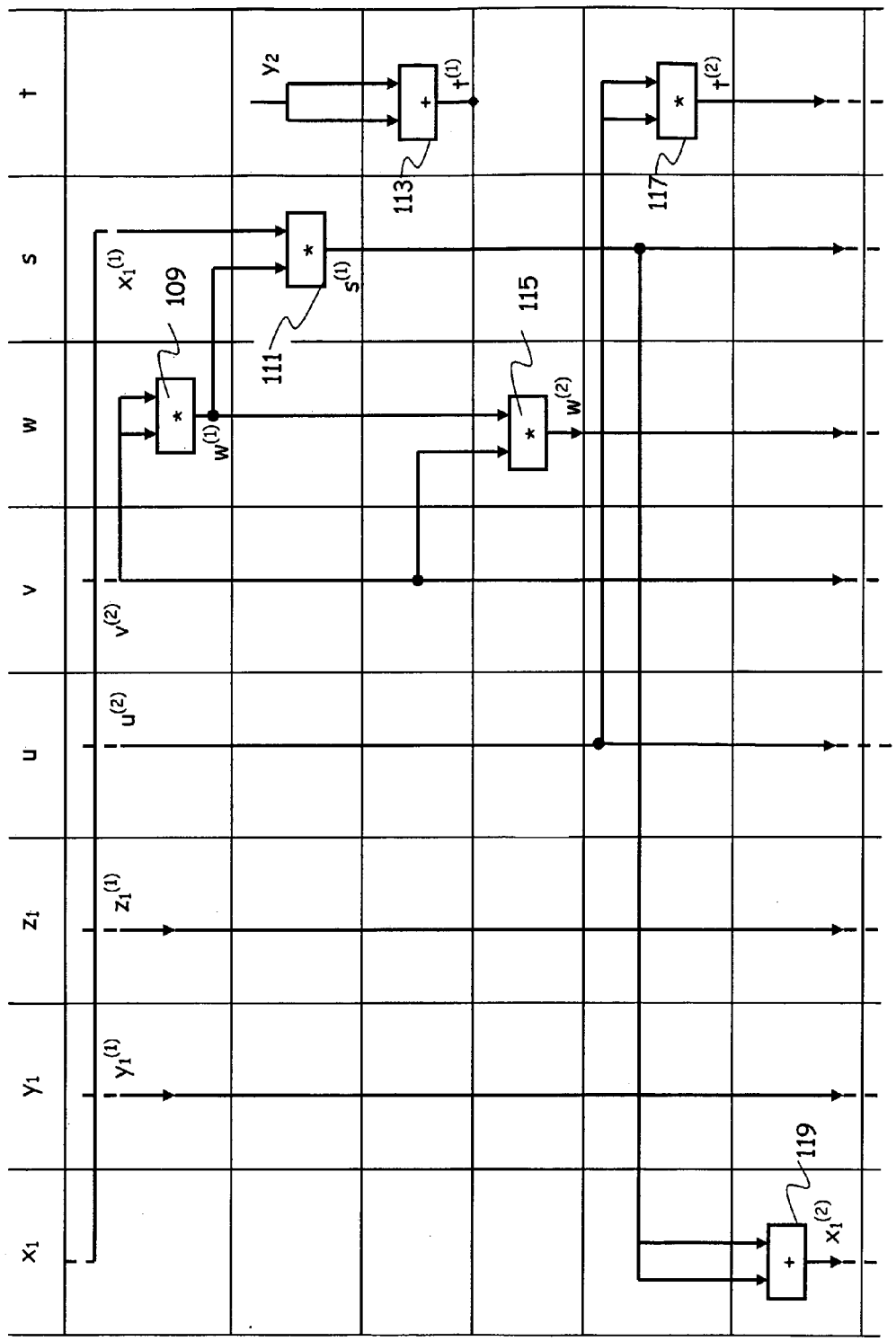
Figure 1C:
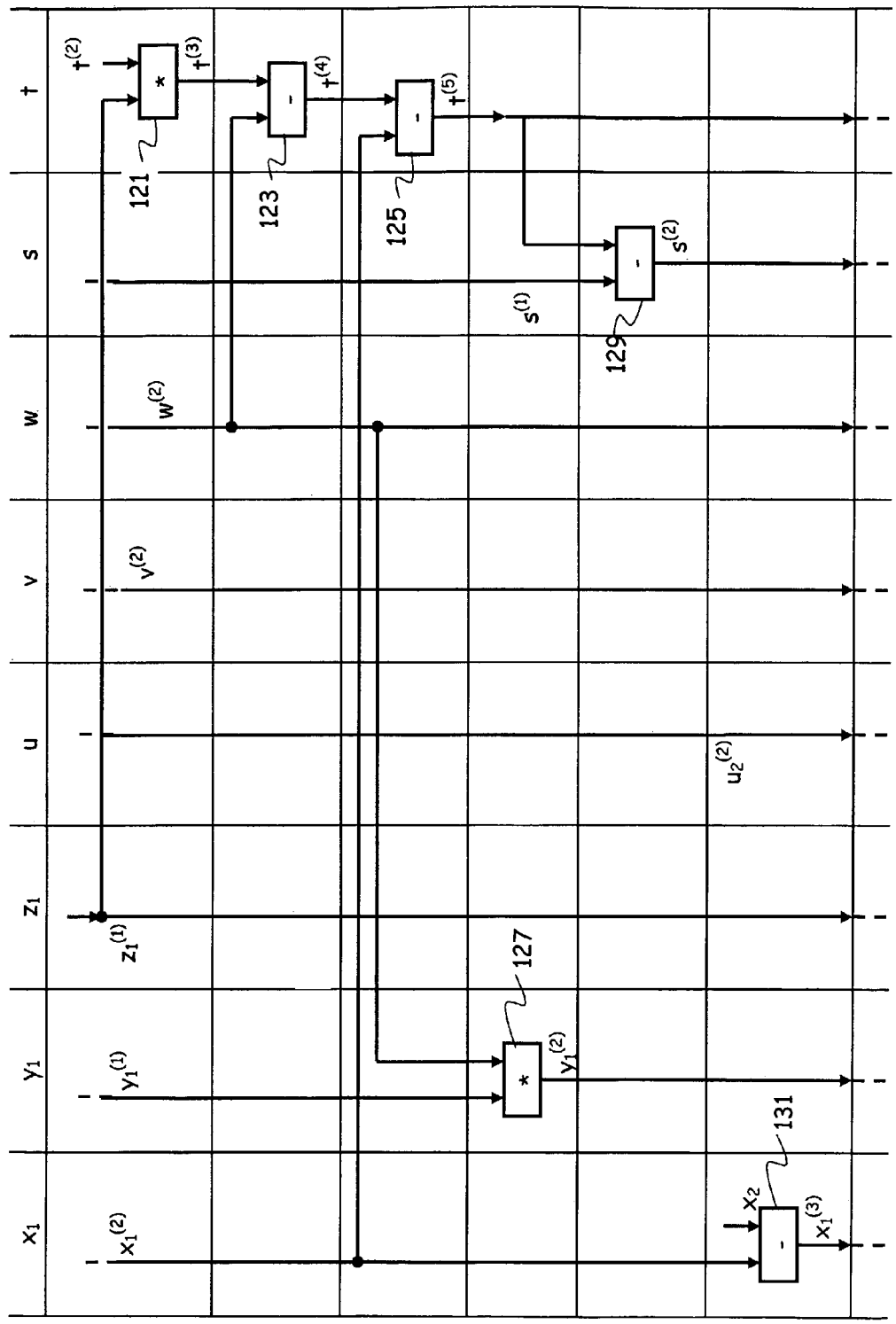
Figure 1D:
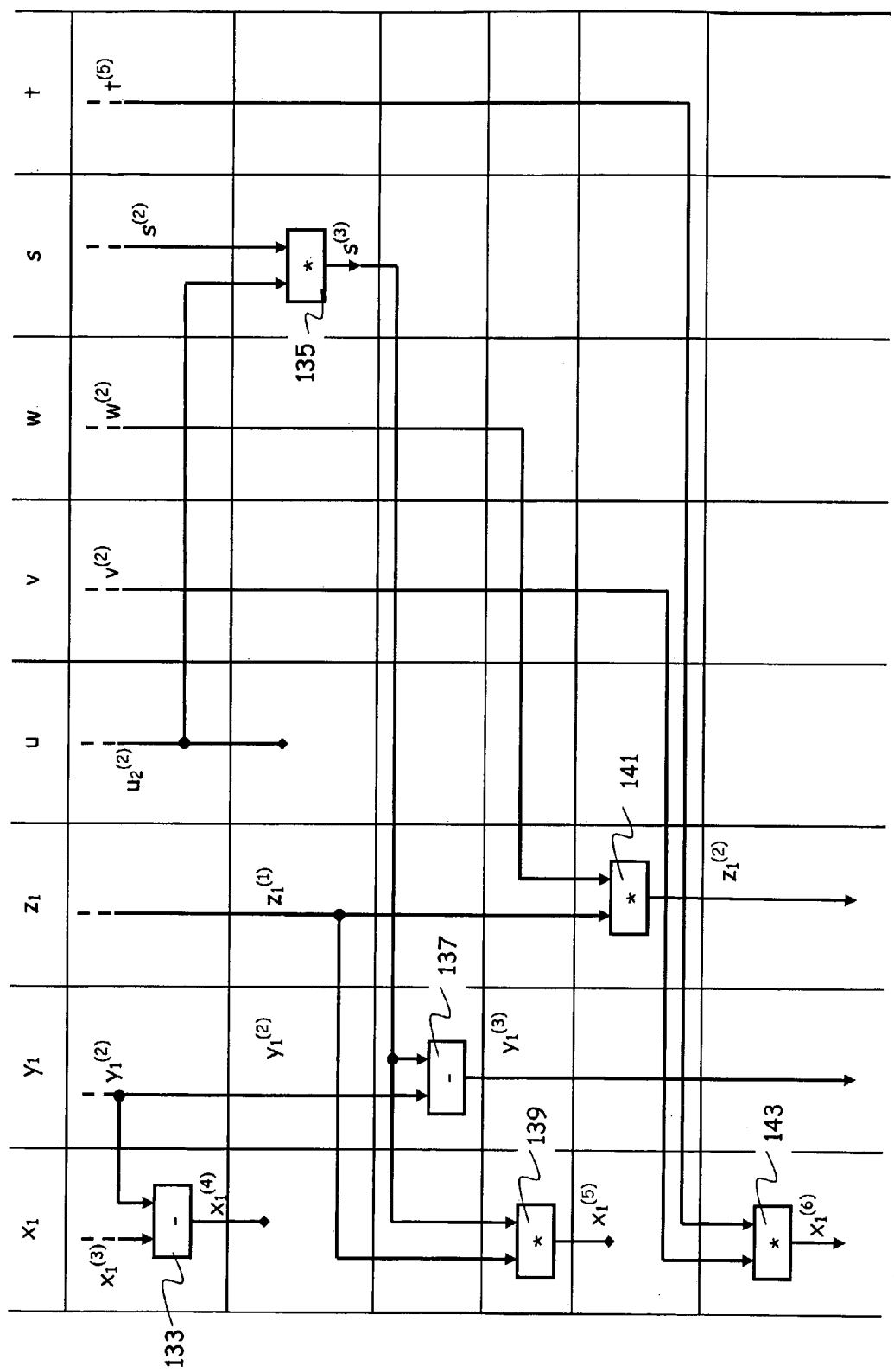
Figure 2A:
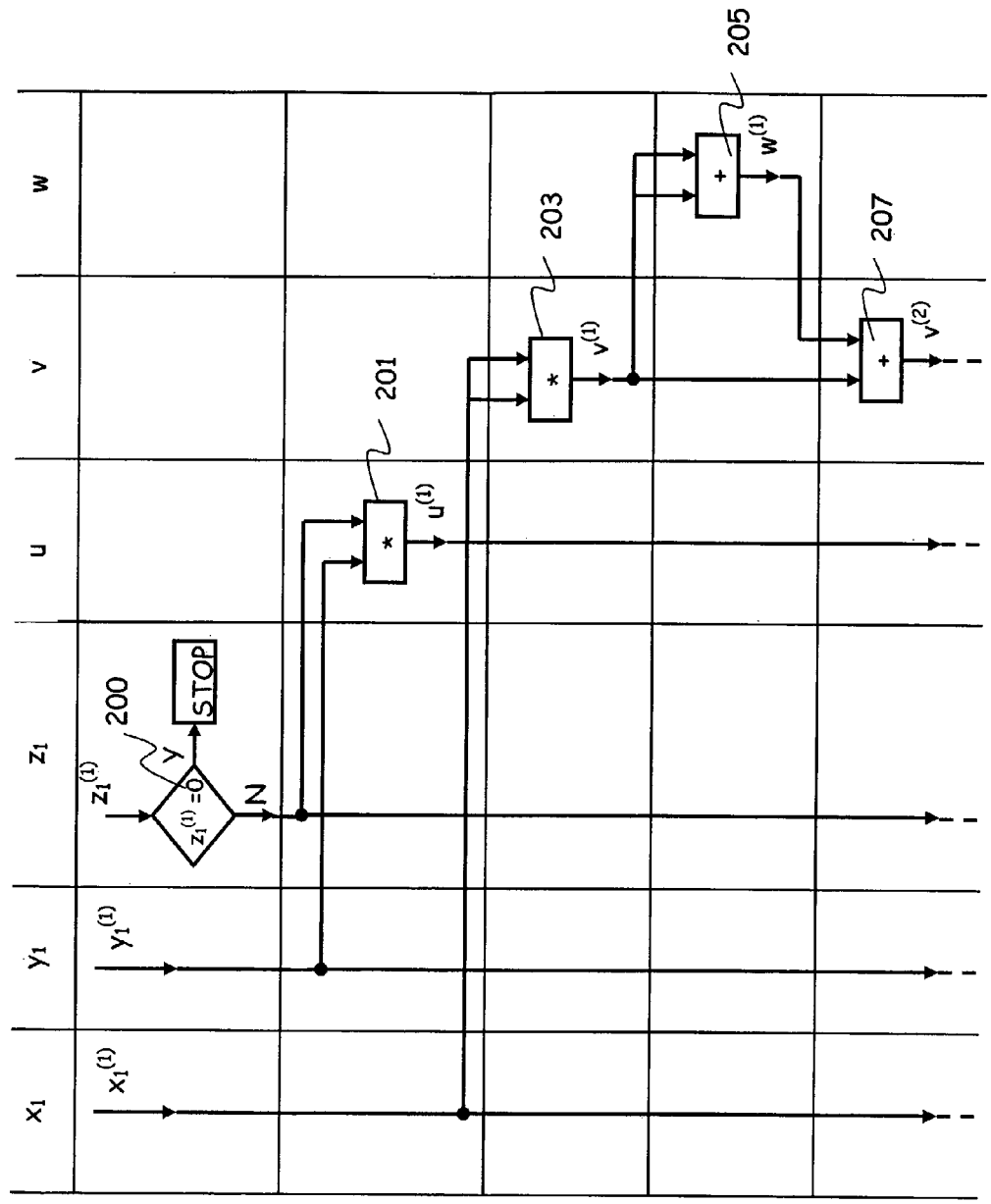
FIGS. 2A to 2E show a schematic block diagram of a structure adapted to implement an algorithm for point doubling in projective coordinates, according to an embodiment of the present invention.
Figure 2B:
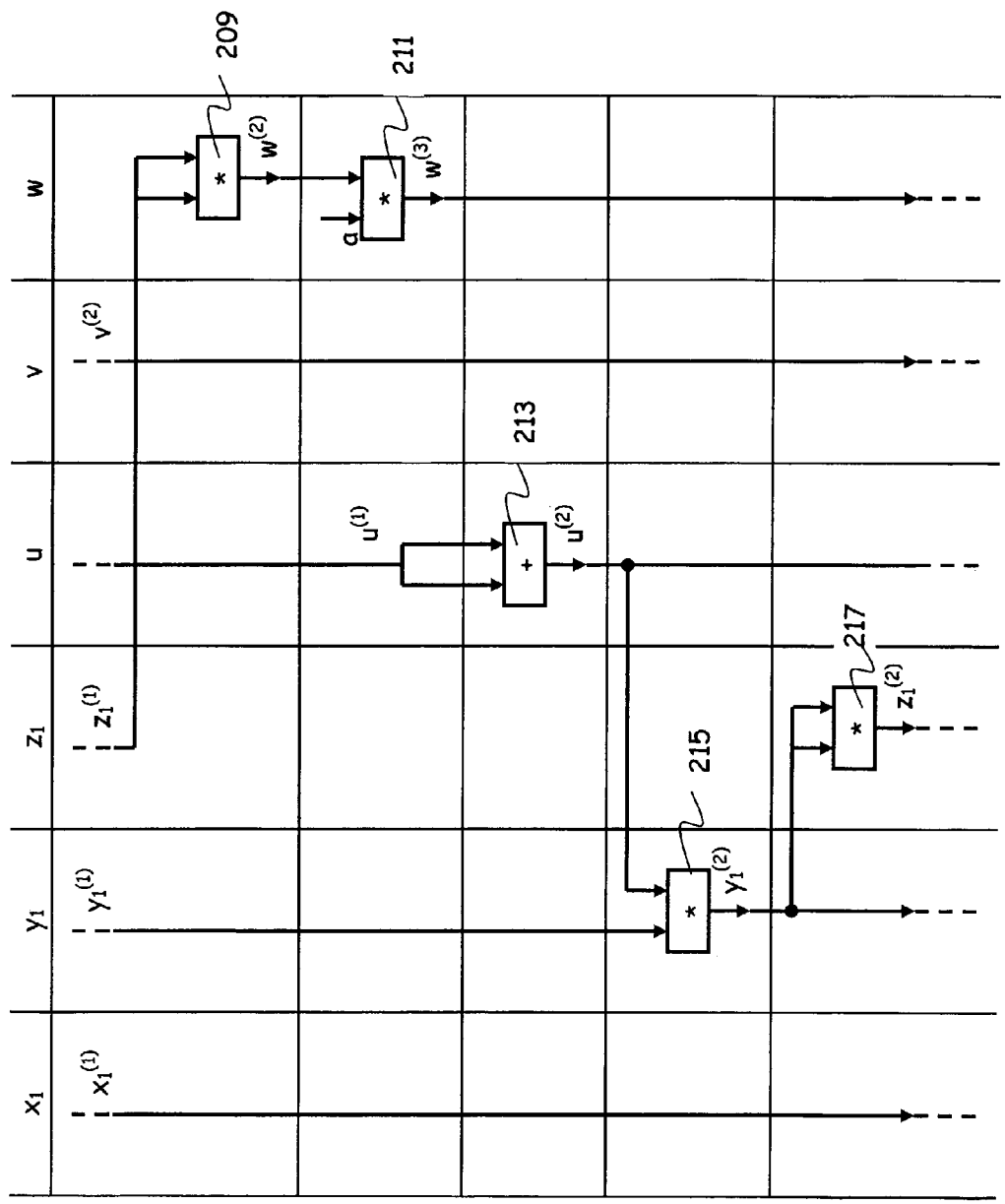
Figure 2C:
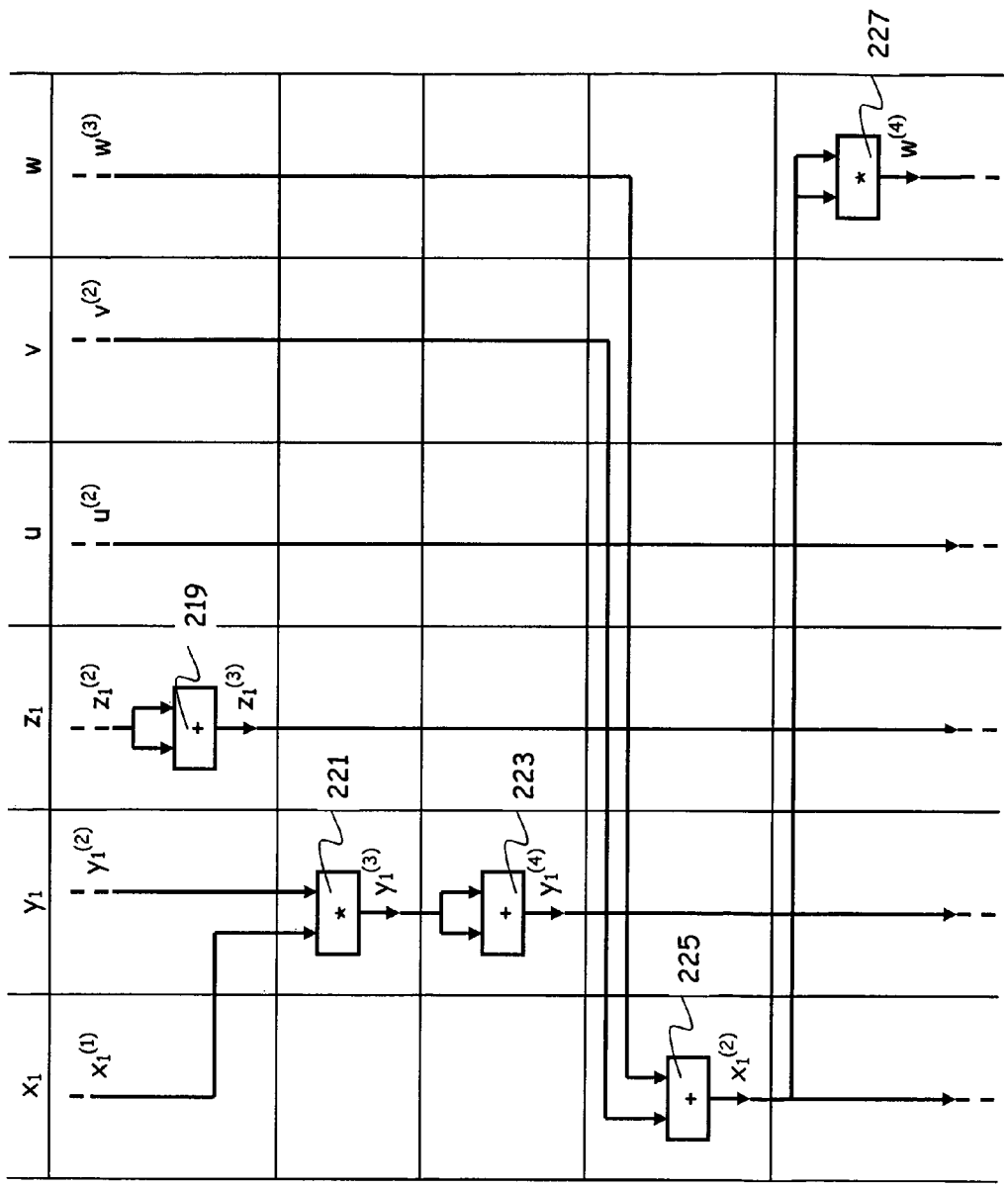
Figure 2D:
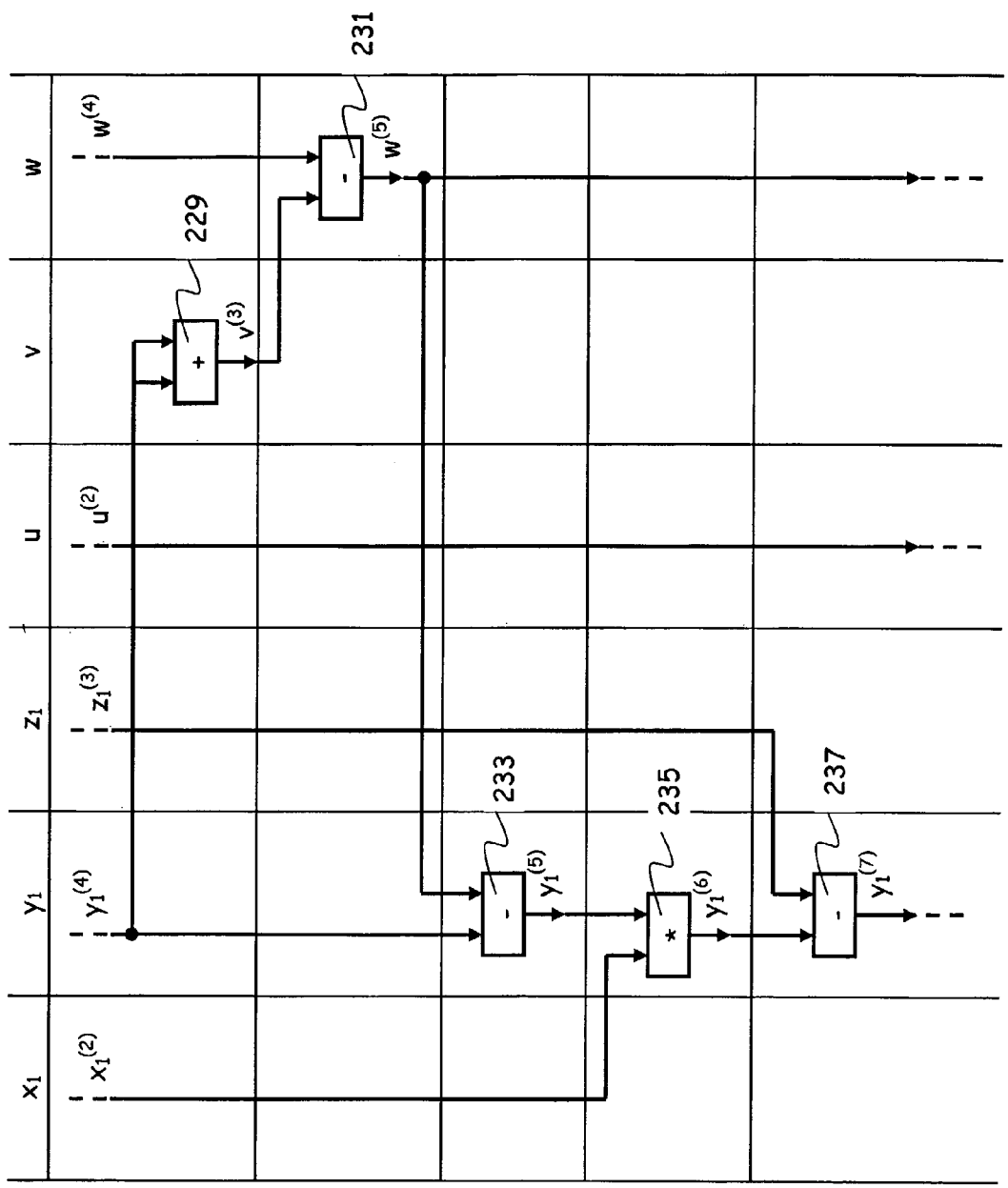
Figure 2E:
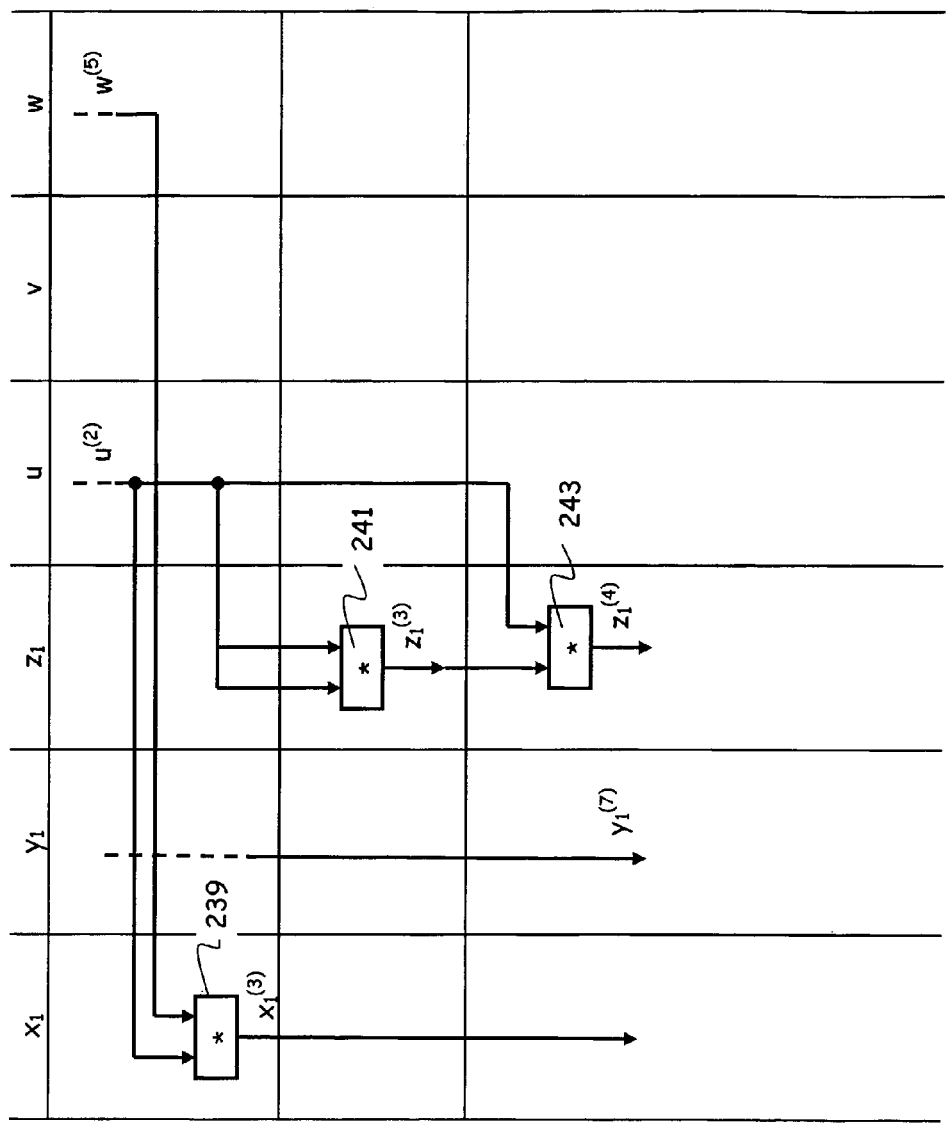

As discussed in the introductory part of the present description, the main operation over elliptic curve groups that is required for cryptosystems such as ECDH or ECDSA is the scalar multiplication of a base point P by a scalar k, and is denoted as kP, where k is a positive integer; this operation is a repeated addition of a point P with itself k−1 times, i.e., P+ . . . +P, and, in practical cryptographic applications, k is a secret and very large number, typically, several hundred bits long, e.g., a secret key. The base point P can be selected according to the criteria specified in the cryptosystems ECDH and ECDSA.

The scalar multiplication can be computed efficiently using the double-and-add algorithm; in particular, assuming a binary representation for the number k:

$$k = (k_{t-1}, k_{t-2}, \ldots, k_1, k_0)_2 = \sum_{i=0}^{t-1} k_i 2^i,$$

the double-and-add algorithm can be implemented in the left-to-right manner, going from the most significant bit of the number k downwards, or in the right-to-left manner, going from the least significant bit of the number k upwards.

A functional block adapted to implement (in hardware or software or a mix of the two) the double-and-add algorithm receives in input the base point P and the scalar k, and uses an auxiliary variable Q, whose value, at the end of the computation, returns the desired result of the scalar multiplication.

According to an embodiment of the present invention, the base point P is represented in affine coordinates. The Applicant found that it is advantageous to use the projective coordinates for representing the auxiliary variable Q, because with this type of coordinates the operations of point doubling and point addition in each iteration of the double-and-add algorithm are performed without computing the inversion in the underlying prime field.

For example, the left-to-right implementation of the double-and-add algorithm, where the intermediate point (auxiliary variable) Q is represented in projective coordinates, is given as follows.

| Double-and-add, left-to-right, scalar multiplication |
| --- |
| Input: $k = (k_{t-1}, k_{t-2}, \ldots, k_1, k_0)_2$ |
| $P = (x_1, y_1)$ in affine coordinates |
| Output: $Q = kP$ in projective coordinates |
| Auxiliary variable: $Q = (x, y, z)$ in projective coordinates |
| $Q \leftarrow O$ |
| for i from t − 1 down to 0 |
| $Q \leftarrow 2Q$ |
| if $k_i = 1$ then $Q \leftarrow Q + P$ |

For simplicity, the algorithm is presented in its basic form, which may be vulnerable to the timing or SPA attacks due to a slight imbalance of operations even if the point addition and point doubling are perfectly balanced. Namely, in this form, the logic "if" instruction is performed after each point doubling, but is not performed after any point addition. Balancing can be achieved by introducing a dummy logic "if" instruction after the point addition with a condition that is never satisfied, e.g., "if $k_i=0$ then stop".

For a t-bit scalar k, t point doubling operations need to be computed, and, on average, t/2 point additions. If the number k is not bigger than the order of the point P, which is defined as the minimal positive integer n such that $nP=0$, then it is guaranteed that in each iteration of the algorithm it is true that $Q \ne P$, so that the addition of different points is then performed.

Having the base point P represented in affine coordinates is advantageous, because in this way the expressions for point addition simplify, the number of multiplications being reduced by 3, as the third coordinate of P is equal to 1. This type of addition is referred to as the addition of points in mixed coordinates, one point, P, being given in affine coordinates and the other point, Q, being given in projective coordinates. On the other hand, the point doubling is always performed in projective coordinates. The final result, if different from the neutral point O, is then converted back to affine coordinates; if the final result is equal to the neutral point O, this is readily identified thanks to the fact that projective coordinates are used for the auxiliary variable, the third coordinate being equal to zero.

The Applicant observed that by performing the point addition in mixed coordinates in the basic double-and-add algorithm, the number of multiplications required for performing the point addition is nine, whereas the number of multiplications required for performing the point doubling is seven; the number of squaring operations required is two for the point addition, and five for the point doubling. Besides, a number of subtractions, additions, and doublings are also required, but these operations have a much smaller computational cost than multiplications and squaring operations.

The Applicant found that, at least as far as the techniques exploited in side-channel attacks are concerned, a reasonable assumption is that it is practically very difficult to distinguish, at least with respect to timing and power consumption, between a squaring and a multiplication as well as among an addition, a subtraction, and a doubling, all operations being performed in the underlying prime field.

On the basis of this observation, the Applicant found that by introducing a small number of dummy operations in the basic sequences of elementary field operations for performing the point addition in mixed coordinates and the point doubling in projective coordinates that compose the double-and-add algorithm, these two sequences can be balanced to an extent sufficient to achieve a high resistance against at least certain side channel attacks. In particular, the Applicant found that introducing only one supplementary dummy multiplication and three supplementary dummy additions in the point addition is sufficient to balance the sequences of elementary field operations for the point addition and point doubling, thus achieving the desired resistance against the timing and SPA attacks.

In the following, under the above-mentioned assumption that multiplications and squaring operations are mutually indistinguishable, at least with respect to timing and power consumption, a multiplication or a squaring operation are commonly denoted by the same symbol M. Also, under the above-mentioned assumption that, at least with respect to timing and power consumption, additions, doublings, and subtractions are mutually indistinguishable, an addition, a doubling, and a subtraction are all denoted by the same symbol A.

In order for the two algorithms for point addition and point doubling to include practically indistinguishable sequences of elementary operations in the underlying prime field, at least with respect to timing and power consumption, the sequence of symbols M and A corresponding to the sequence of operations of the point addition should be identical to the sequence of symbols M and A corresponding to the sequence of operations of the point doubling, the only difference being the operands to which these operations are applied. Also, the final results should be the same as those obtained by applying the formulas for the point addition and point doubling in projective coordinates given above, that is:

addition of $Q=(x_1,y_1,z_1)$ and $P=(x_2,y_2,1)$ into $P+Q=(x_3,y_3,z_3)$: $u_1=y_2z_1-y_1$, $u_2=x_2z_1-x_1$, $u_3=x_2z_1+x_1$, $u_4=u_1^2z_1-u_2^2u_3$ $x_3=u_2u_4$, $y_3=u_1(u_2^2x_1-u_4)-u_2^3y_1$, $z_3=u_2^3z_1$;

doubling of $Q=(x_1,y_1,z_1)$ into $2Q=(x_3, y_3, z_3)$: $u_1=y_1z_1$, $u_2=3x_1^2+az_1^2$, $u_3=y_1u_1$, $u_4=x_1u_3$, $u_5=u_2^2-8u_4$ $x_3=2u_1u_5$, $y_3=u_2(4u_4-u_5)-8u_3^2$, $z_3=8u_1^3$.

Preferably, albeit not limitatively, the two sequences should include the minimum possible number of M operations, and the total number of operations M and A should be as low as possible. Also, the number of auxiliary variables needed for the computations should be minimal.

Hereinafter, two exemplary algorithms are described, referred to as Algorithm 1 and Algorithm 2, respectively, for performing the point addition and the point doubling operations. The two algorithms, Algorithm 1 and Algorithm 2, are balanced, i.e., include identical sequences of M and A operations and are designed to satisfy the further, preferred albeit not limitative requirements that the number of M operations, the number of A operations, and the number of auxiliary variables should all be close to being minimal.

---

Algorithm 1: Point addition in mixed coordinates

Input:  $Q = (x_1, y_1, z_1)$ in projective coordinates
        $P = (x_2, y_2, 1)$ in affine coordinates, $P \neq Q$ and $P \neq O$
Output: $Q = Q + P = (x_1, y_1, z_1)$ in projective coordinates
Auxiliary variables: u, v, w, s, t if $z_1 = 0$ then $Q \leftarrow P$ and stop
$u \leftarrow y_2 \cdot z_1$
$v \leftarrow x_2 \cdot z_1$
$u \leftarrow u - y_1$
$v \leftarrow v - x_1$
$w \leftarrow v \cdot v$
$s \leftarrow x_1 \cdot w$
$t \leftarrow y_2 + y_2$
$w \leftarrow w \cdot v$
$t \leftarrow u \cdot u$
$x_1 \leftarrow s + s$
$t \leftarrow t \cdot z_1$
$t \leftarrow t - w$
$t \leftarrow t - x_1$
$y_1 \leftarrow y_1 \cdot w$
$s \leftarrow s - t$
$x_1 \leftarrow x_1 - x_2$
$x_1 \leftarrow x_1 - y_1$
$s \leftarrow s \cdot u$
$y_1 \leftarrow s - y_1$
$x_1 \leftarrow z_1 \cdot s$
$z_1 \leftarrow z_1 \cdot w$
$x_1 \leftarrow v \cdot t$

---

In FIGS. 1A to 1D a schematic block diagram of a possible hardware implementation of the Algorithm 1 is presented. The auxiliary variables can be implemented by using registers, latches, and the like.

After having ascertained that, at the beginning of the generic iteration of the double-and-add algorithm, the initial value $z_1^{(1)}$ of the coordinate $z_1$ of the auxiliary variable Q is not zero (an operation schematized by means of the decision block 100), the initial value $z_1^{(1)}$ of the coordinate $z_1$ and the value of the coordinate $y_2$ are multiplied (multiplier 101), to obtain a first value $u^{(1)}$ for the auxiliary variable u (if instead $z_1=0$, then the computation is stopped). Then, the initial value $z_1^{(1)}$ of the coordinate $z_1$ and the value $x_2$ of the coordinate $x_2$ are multiplied (multiplier 103) to obtain a first value $v^{(1)}$ for the auxiliary variable v. Afterwards, the initial value $y_1^{(1)}$ of the coordinate $y_1$ is subtracted from the first value $u^{(1)}$ for the auxiliary variable u (subtractor 105) to obtain a second value of $u^{(2)}$ for the auxiliary variable u. Subsequently, the initial value $x_1^{(1)}$ of the coordinate $x_1$ is subtracted from the first value $v^{(1)}$ for the auxiliary variable v (subtractor 107) to obtain a second value of $v^{(2)}$ for the auxiliary variable v. The second value of $v^{(2)}$ for the auxiliary variable v is then multiplied by itself (i.e., it is squared) (multiplier 109) to obtain a first value $w^{(1)}$ for the auxiliary variable w. The first value $w^{(1)}$ for the auxiliary variable w is multiplied by the initial value $x_1^{(1)}$ of the coordinate $x_1$ (multiplier 111) to obtain a first value $s^{(1)}$ for the auxiliary variable s. Then, the coordinate $y_2$ is added to itself (adder 113) to obtain a first value $t^{(1)}$ for the auxiliary variable t. The first value $w^{(1)}$ for the auxiliary variable w is multiplied by the second value of $v^{(2)}$ for the auxiliary variable v (multiplier 115) to obtain a second value $w^{(2)}$ for the auxiliary variable w. The second value of $u^{(2)}$ for the auxiliary variable u is multiplied by itself (multiplier 117) to obtain a second value $t^{(2)}$ for the auxiliary variable t. The first value $s^{(1)}$ for the auxiliary variable s is added to itself (adder 119) to obtain an updated, second value $x_1^{(2)}$ of the coordinate $x_1$. The initial value $z_1^{(1)}$ of the coordinate $z_1$ and the second value $t^{(2)}$ for the auxiliary variable t are then multiplied (multiplier 121) to obtain a third value $t^{(3)}$ for the auxiliary variable t. The second value $w^{(2)}$ for the auxiliary variable w is then subtracted (subtractor 123) from the third value $t^{(3)}$ for the auxiliary variable t, to obtain a fourth value $t^{(4)}$ for the auxiliary variable t. The second value $x_1^{(2)}$ of the coordinate $x_1$ is then subtracted (subtractor 125) from the fourth value $t^{(4)}$ for the auxiliary variable t, to obtain a fifth value $t^{(5)}$ for the auxiliary variable t. The initial value $y_1^{(1)}$ of the coordinate $y_1$ is then multiplied (multiplier 127) by the second value $w^{(2)}$ for the auxiliary variable w to obtain an updated, second value $y_1^{(2)}$ of the coordinate $y_1$. The fifth value $t^{(5)}$ for the auxiliary variable t is then subtracted (subtractor 129) from the first value $s^{(1)}$ for the auxiliary variable s to obtain a second value $s^{(2)}$ for the auxiliary variable s. The value $x_2$ of the coordinate $x_2$ is then subtracted (subtractor 131) from the second value $x_1^{(2)}$ of the $x_1$ coordinate, to obtain a third value $x_1^{(3)}$ of the coordinate $x_1$. The second value $y_1^{(2)}$ of the coordinate $y_1$ is then subtracted (subtractor 133) from the third value $x_1^{(3)}$ of the coordinate $x_1$ to obtain a fourth value $x_1^{(4)}$ of the coordinate $x_1$. The second value $s^{(2)}$ for the auxiliary variable s is then multiplied (multiplier 135) by the second value of $u^{(2)}$ for the auxiliary variable u, to obtain a third value $s^{(3)}$ for the auxiliary variable s. The second value $y_1^{(2)}$ of the coordinate $y_1$ is then subtracted (subtractor 137) from the third value $s^{(3)}$ for the auxiliary variable s to obtain a third value $y_1^{(3)}$ of the coordinate $y_1$. The third value $s^{(3)}$ for the auxiliary variable s is then multiplied (multiplier 139) by the initial value $z_1^{(1)}$ of the coordinate $z_1$ to obtain a fifth value $x_1^{(5)}$ of the coordinate $x_1$. The second value $w^{(2)}$ for the auxiliary variable w is then multiplied (multiplier 141) by the initial value $z_1^{(1)}$ of the coordinate $z_1$ to obtain an updated, second value $z_1^{(2)}$ of the coordinate $z_1$. Finally, the fifth value $t^{(5)}$ for the auxiliary variable t is multiplied (multiplier 143) by the second value of $v^{(2)}$ for the auxiliary variable v to obtain a final, sixth value $x_1^{(6)}$ of the coordinate $x_1$.

The sixth value $x_1^{(6)}$ of the coordinate $x_1$, the third value $y_1^{(3)}$ of the coordinate y, and the second value $z_1^{(2)}$ of the coordinate $z_1$ form the output of the point addition (in the considered iteration of the double-and-add algorithm). The dummy operations are the addition performed by the adder 113, the subtractions performed by the subtractors 131 and 133, and the multiplication performed by the multiplier 139.

---

Algorithm 2: Point doubling in projective coordinates

Input:  $a, Q = (x_1, y_1, z_1)$ in projective coordinates
Output: $Q = Q + Q = 2Q = (x_1, y_1, z_1)$ in projective coordinates
Auxiliary variables: u, v, w if $z_1 = 0$ then $Q \leftarrow Q$ and stop
$u \leftarrow y_1 \cdot z_1$
$v \leftarrow x_1 \cdot x_1$
$w \leftarrow v + v$
$v \leftarrow v + w$ -continued Algorithm 2: Point doubling in projective coordinates $w \leftarrow z_1 \cdot z_1$
$w \leftarrow a \cdot w$
$u \leftarrow u + u$
$y_1 \leftarrow y_1 \cdot u$
$z_1 \leftarrow y_1 \cdot y_1$
$z_1 \leftarrow z_1 + z_1$
$y_1 \leftarrow y_1 \cdot x_1$
$y_1 \leftarrow y_1 + y_1$
$x_1 \leftarrow v + w$
$w \leftarrow x_1 \cdot x_1$
$v \leftarrow y_1 + y_1$
$w \leftarrow w - v$
$y_1 \leftarrow y_1 - w$
$y_1 \leftarrow y_1 \cdot x_1$
$y_1 \leftarrow y_1 - z_1$
$x_1 \leftarrow u \cdot w$
$z_1 \leftarrow u \cdot u$
$z_1 \leftarrow z_1 \cdot u$ In FIGS. 2A to 2D a schematic block diagram of a possible hardware implementation of the Algorithm 2 is presented. Also in this case, the auxiliary variables (only three instead of five) can be implemented by registers, latches, and the like.

After having ascertained that, at the beginning of the generic iteration of the double-and-add algorithm, the initial value $z_1^{(1)}$ of the coordinate $z_1$ of the auxiliary variable Q is not zero (an operation schematized by means of the decision block 200), the initial value $z_1^{(1)}$ of the coordinate $z_1$ and the value of the initial value $y_1^{(1)}$ of the coordinate $y_1$ are multiplied (multiplier 201), to obtain a first value $u^{(1)}$ for the auxiliary variable u (if instead $z_1=0$, then the computation is stopped). Then, the initial value $x_1^{(1)}$ of the coordinate $x_1$ is multiplied by itself (multiplier 203) to obtain a first value $v^{(1)}$ for the auxiliary variable v. Afterwards, the first value $v^{(1)}$ for the auxiliary variable v is added to itself (adder 205) to obtain a first value $w^{(1)}$ for the auxiliary variable w. Subsequently, the first value $v^{(1)}$ of the auxiliary variable v is added (adder 207) to the first value $w^{(1)}$ of the auxiliary variable w to obtain a second value $v^{(2)}$ for the auxiliary variable v. Then, the initial value $z_1^{(1)}$ of the coordinate $z_1$ is multiplied by itself (multiplier 209) to obtain a second value $w^{(2)}$ of the auxiliary variable w. Subsequently, the second value $w^{(2)}$ of the auxiliary variable w is multiplied (multiplier 211) by the constant a, i.e. the elliptic curve parameter, to obtain a third value $w^{(3)}$ of the auxiliary variable w. The first value $u^{(1)}$ for the auxiliary variable u is then added to itself (adder 213) to obtain a second value $u^{(2)}$ for the auxiliary variable u. The second value $u^{(2)}$ for the auxiliary variable u is then multiplied (multiplier 215) by the initial value $y_1^{(1)}$ of the coordinate $y_1$ to obtain an updated, second value $y_1^{(2)}$ of the coordinate $y_1$. The second value $y_1^{(2)}$ of the coordinate $y_1$ is then multiplied by itself (multiplier 217) to obtain an updated, second value $z_1^{(2)}$ of the coordinate $z_1$. Afterwards, the second value $z_1^{(2)}$ of the coordinate $z_1$ is added to itself (adder 219) to obtain a second value $z_1^{(2)}$ of the coordinate $z_1$. The second value $y_1^{(2)}$ of the coordinate $y_1$ is then multiplied (multiplier 221) by the initial value $x_1^{(1)}$ of the coordinate $x_1$ to obtain a third value $y_1^{(3)}$ of the coordinate $y_1$. The third value $y_1^{(3)}$ of the coordinate $y_1$ is added to itself (adder 223) to obtain a fourth value $y_1^{(4)}$ of the coordinate $y_1$. The second value $v^{(2)}$ for the auxiliary variable v is then added (adder 225) to the third value $w^{(3)}$ of the auxiliary variable w to obtain a second value $x_1^{(2)}$ of the coordinate $x_1$. The second value $x_1^{(2)}$ of the coordinate $x_1$ is then multiplied by itself (multiplier 227) to obtain a fourth value $w^{(4)}$ of the auxiliary variable w. The fourth value $y_1^{(4)}$ of the coordinate $y_1$ is then added to itself (adder 229) to obtain a third value $V^{(3)}$ for the auxiliary variable v. The third value $V^{(3)}$ for the auxiliary variable v is then subtracted (subtractor 231) from the fourth value $w^{(4)}$ of the auxiliary variable w to obtain a fifth value $w^{(5)}$ of the auxiliary variable w. The fifth value $w^{(5)}$ of the auxiliary variable w is subtracted (subtractor 233) from the fourth value $y_1^{(4)}$ of the coordinate $y_1$ to obtain a fifth value $y_1^{(5)}$ of the coordinate $y_1$. The fifth value $y_1^{(5)}$ of the coordinate $y_1$ is then multiplied (multiplier 235) by the second value $x_1^{(2)}$ of the coordinate $x_1$ to obtain a sixth value $y_1^{(6)}$ of the coordinate $y_1$. The second value $z_1^{(2)}$ of the coordinate $z_1$ is then subtracted (subtractor 237) from the sixth value $y_1^{(6)}$ of the coordinate $y_1$ to obtain a seventh value $y_1^{(7)}$ of the coordinate $y_1$. The fifth value $w^{(5)}$ of the auxiliary variable is then multiplied (multiplier 239) by the second value $u^{(2)}$ for the auxiliary variable u to obtain a third value $x_1^{(3)}$ of the coordinate $x_1$. The second value $u^{(2)}$ for the auxiliary variable u is multiplied by itself (multiplier 241) to obtain a third value $z_1^{(3)}$ of the coordinate $z_1$. Finally, the third value $z_1^{(3)}$ of the coordinate $z_1$ is multiplied (multiplier 243) by the second value $u^{(2)}$ for the auxiliary variable u to obtain a fourth value $z_1^{(4)}$ of the coordinate $z_1$.

The third value $x_1^{(3)}$ of the coordinate $x_1$, the seventh value $y_1^{(7)}$ of the coordinate $y_1$ and the fourth value $z_1^{(4)}$ of the coordinate $z_1$ form the output of the point doubling (in the considered iteration of the double-and-add algorithm). No dummy operations are inserted.

In the two algorithms Algorithm 1 and Algorithm 2 set forth above, it is assumed that the resulting point Q is stored in one of the operands, that is, as the updated value of the point Q, as this is convenient for the scalar multiplication algorithms such as the double-and-add algorithm. However, this is not to be intended as a limitation of the present invention.

The corresponding sequence of M and A operations in both the algorithms Algorithm 1 and Algorithm 2 (the sequence of operations is the same for both the algorithms), is thus

MMAAMMAMMAMAAMAAAMAMMM;

the sequence has a total length of twenty-two operations, and consists of twelve M operations (multiplications or squaring operations) and ten A operations (additions, subtractions, or doublings). The sequence for Algorithm 1 contains, as mentioned above, one dummy M operation and three dummy A operations, whereas the sequence for Algorithm 2 contains no dummy operations. Thus, with just four dummy operations included in the algorithm for performing point addition it is possible to balance the two algorithms. The number of auxiliary variables is five for Algorithm 1 and three for Algorithm 2.

For the sake of completeness, as in the scalar multiplication algorithms it may happen that Q=O, the initial test, being essentially the same for both the algorithms, is also included in their description. If this happens in Algorithm 1, then the output is set to be equal to P and this is why the third coordinate, equal to 1, is also formally included in the representation of P, but is never used in the algorithm computations. In the scalar multiplication algorithms such as the double-and-add algorithm, the initialization condition Q=O implies that this test is needed in both the algorithms in the first, initial iteration. However, if it is known that the scalar bit in the first iteration (e.g. the most significant bit in the left-to-right versions) is equal to 1, then this test can be omitted by assuming the initialization condition Q=P and by running the scalar multiplication from the second iteration onwards. On the other hand, if the scalar k is not bigger than the order n of the base point P, i.e., if k≤n, then, except in the initial iteration, the condition Q=O may happen only at the end of the algorithm and this happens if and only if k=n.

It is to be noted that the input conditions P=Q and P=O are not allowed in Algorithm 1. The condition P≠O is satisfied by the choice of P. In the scalar multiplication algorithms such as the double-and-add algorithm, the condition P≠Q is automatically satisfied if k≤n.

The two algorithms Algorithm 1 and Algorithm 2 are perfectly balanced, from the viewpoint of the sequences of elementary operations in the prime field, under the assumption that it is not possible to distinguish between a squaring and a multiplication as well as among an addition, a subtraction, and a doubling in the underlying prime field. This assumption is realistic especially for hardware implementations, provided that the additions, subtractions, and multiplications in the prime field are properly performed; later in this description, some examples of suitable algorithms for the addition, subtraction, and multiplication are provided. Furthermore, as a multiplication by a small constant may possibly be distinguished from a general multiplication, such multiplications in Algorithm 2 are always performed by using additions.

It is pointed out that the present invention is not limited to the two algorithms Algorithm 1 and Algorithm 2 set forth above. Any simple transformation of Algorithms 1 and 2, including, for example, an appropriate permutation of the elementary operations, an insertion of more dummy operations, an insertion of more auxiliary variables, such that the two corresponding sequences of M and A operations are essentially the same and that the final results are not changed, is also intended to be covered by the present invention.

In the practice, the balanced point addition and point doubling algorithms Algorithm 1 and Algorithm 2, being the building blocks of the double-and-add algorithm, are expediently used in scalar multiplication algorithms, which are essential to cryptosystems such as the cryptographic protocols ECDH for Diffie-Hellman secret key exchange and ECDSA for digital signatures.

More generally, Algorithm 1 and Algorithm 2 can be exploited in any scalar multiplication algorithm defined as a sequence of point additions, doublings, and subtractions in the underlying elliptic curve group. It is to be noted that the point subtraction Q–P can be performed as a point addition Q+(–P), where the negative of a point P=(x,y), –P=(x,–y), is computed by just one extra integer subtraction by virtue of –y mod p=p–y, or it can be computed in advance and stored. In particular, in addition to being applicable in the double-and-add algorithm, for example, in the left-to-right form set forth in the foregoing, the two balanced algorithms Algorithm 1 and Algorithm 2 can be exploited in scalar multiplication algorithms that use a signed binary representation of the scalar, possibly in a Non-Adjacent Form (NAF), where the scalar is represented as $$k = (k_{t-1}, k_{t-2}, \ldots, k_1, k_0)_2 = \sum_{i=0}^{t-1} k_i 2^i,$$

with the coefficients $k_i$ taking values 0, 1, and –1, and, as provided by the NAF, without adjacent non-zero digits (the advantage of the NAF resides in a reduced number of non-zero digits when compared with the standard binary representation). An example of these algorithms is the so called "double-and-add-or-subtract" algorithm, which can be used to perform the scalar multiplication, and can be expressed, for example, as follows (in the left-to-right form).

| Double-and-add-or-subtract, left-to-right, scalar multiplication |
|---|
| Input: $k = (k_{t-1}, k_{t-2}, \ldots, k_1, k_0)_2$ <br> $P = (x_1, y_1)$ in affine coordinates <br> Output: Q = kP in projective coordinates <br> Auxiliary variable: Q = (x,y,z) in projective coordinates <br>   Q ← O <br>   for i from t – 1 down to 0 <br>     Q ← 2Q <br>     if $k_i$ = 1 then Q ← Q + P <br>     if $k_i$ = –1 then Q ← Q – P |

When Algorithm 1 and Algorithm 2 are used in scalar multiplication algorithms, the final result of the scalar multiplication should be converted from projective to affine coordinates, unless the result is equal to the neutral point. This conversion requires one inversion and two multiplications in the prime field, namely:

$$(x_p, y_p, z_p) \rightarrow (x_p \cdot z_p^{-1}, y_p \cdot z_p^{-1}) = (x_a, y_a).$$

For this conversion, the inversion operation in the prime field has to be implemented by using one of the standard algorithms. However, if the multiplication in the prime field is implemented in hardware, for example, by providing a dedicated hardware module, then for many applications it is sufficient to implement the inversion as an exponentiation, in view of the fact that, in a prime field with p elements, it is true that $z^{-1}=z^{p-2}$. This is especially efficient if the exponentiation itself is also implemented in hardware, in terms of the multiplication, possibly by using a square-and-multiply algorithm. Note that for a cryptosystem such as ECDSA, it is also required to perform some modular integer arithmetic including the inversion, where the modulus is the (prime) order of the base point used.

As mentioned in the foregoing, the balancing of the two operation sequences for the point addition in mixed coordinates and the point doubling in projective coordinates is achieved under the assumption that multiplication and squaring operations on one side, and addition, doubling, and subtraction operations on the other side are essentially indistinguishable, at least from the viewpoint of a side-channel attacker. Thus, when Algorithm 1 and Algorithm 2 are applied in a scalar multiplication algorithm as described above, in order to achieve the desired resistance against side-channel attacks of the corresponding cryptosystems, such as the timing attack and SPA attack, the elementary operations in the underlying prime field should be implemented in such a way that multiplications and squaring operations, on one hand, and additions, doublings, and subtractions, on the other, are mutually practically indistinguishable with respect to timing and power consumption, respectively. The two conditions are here denoted as MIND and AIND conditions, respectively. The MIND condition, regarding multiplications and squaring operations, is believed to be more important, as the corresponding computational complexity is much higher than for additions, doublings, and subtractions. In the practice, the MIND and AIND conditions can be satisfied both in a software implementation and in a hardware implementation, albeit it is expected to be easier to satisfy them in a hardware implementation.

In particular, according to an embodiment of the present invention, in order to satisfy the AIND condition with respect to addition and subtraction, these two operations may be respectively implemented by the modular addition and modular subtraction algorithms shown hereinbelow, under the reasonable assumption that the regular integer addition and subtraction are indistinguishable.

| Modular addition | |
|---|---|
| Input: | $p, 0 \leq x, y \leq p - 1$ |
| Output: | $z = (x + y) \bmod p$ |
| Auxiliary variable: | $u$ |
| $z \leftarrow x + y$ | |
| $u \leftarrow z - p$ | |
| if $u \geq 0$ | |
|    then $z \leftarrow u$ | |
|    else $z \leftarrow z$ | |

| Modular subtraction | |
|---|---|
| Input: | $p, 0 \leq x, y \leq p - 1$ |
| Output: | $z = (x - y) \bmod p$ |
| Auxiliary variable: | $u$ |
| $z \leftarrow x - y$ | |
| $u \leftarrow z + p$ | |
| if $u \geq 0$ | |
|    then $z \leftarrow u$ | |
|    else $z \leftarrow z$ | |

In order to satisfy the AIND condition with respect to addition and doubling, the doubling can be implemented as an addition.

To satisfy the MIND condition, the squaring can be implemented as a multiplication, and the multiplication itself may be implemented by the well-known Montgomery multiplication algorithm, for example, in the binary form given in the algorithm below.

| Modular multiplication - Binary Montgomery multiplication | |
|---|---|
| Input: | $p = (p_{m-1}, p_{m-2}, \ldots, p_1, p_0)_2$, $p_{m-1} = p_0 = 1$ |
| | $x = (x_{m-1}, x_{m-2}, \ldots, x_1, x_0)_2$ |
| | $y = (y_{m-1}, y_{m-2}, \ldots, y_1, y_0)_2$ |
| | $0 \leq x, y \leq p - 1$ |
| | $R = 2^m$    $(R > p)$ |
| Output: | $z = (z_{m-1}, z_{m-2}, \ldots, z_1, z_0)_2 = x \cdot_M y = x \cdot y \cdot R^{-1} \bmod p$ |
| Auxiliary variables: | $z = (z_m, z_{m-1}, z_{m-2}, \ldots, z_1, z_0)_2$ |
| | $u = (u_m, u_{m-1}, u_{m-2}, \ldots, u_1, u_0)_2$ |
| $z \leftarrow 0$ | |
| for i from 0 to m - 1 | |
|   $z \leftarrow z + x_i \cdot y$ | |
|   $z \leftarrow z + z_0 \cdot p$ | |
|   $z \leftarrow z/2$ | |
| $u \leftarrow z - p$ | |
| if $u \geq 0$ | |
|   then $z \leftarrow u$ | |
|   else $z \leftarrow z$ | |

Given an odd m-bit modulus p and two m-bit integers x and y, as well as an integer $R = 2^m$, the algorithm outputs the m-bit integer $z = x \cdot_M y = x \cdot y \cdot R^{-1} \bmod p$. If the operands are represented in the Montgomery form $x_M = x \cdot R \bmod p$ and $y_M = y \cdot R \bmod p$, then the output is the modular product of x and y represented in the Montgomery form, that is, $z_M = x_M \cdot_M y_M = (x \cdot y) \cdot R \bmod p$. The conversions between the normal integer form and the Montgomery form can themselves be performed by the same algorithm above, that is, $$x_M = x \cdot_M (R^2 \bmod p)$$

and $$x = x_M \cdot_M 1,$$

where the constant $R^2 \bmod p$ has to be computed in advance.

On the other hand, any algorithms for performing the addition and subtraction in the prime field, such as those shown in the foregoing, have the same property, namely, that if the operands are in the Montgomery form, then the output result is also in this form. Consequently, to perform a series of consecutive operations in the prime field, the operations being addition, subtraction, and multiplication, as in the case of Algorithm 1 and Algorithm 2 (and hence also in any scalar multiplication algorithm implemented in terms of Algorithm 1 and Algorithm 2), the input integers as well as the input constants, if any, should be converted into the Montgomery form only at the beginning, then the series of operations can be performed by the algorithms described above with all the operands and the results being in the Montgomery form, and then the final result should be converted back into the integer form. It should be noted that in scalar multiplication algorithms, the integers dealt with are the coordinates of the points involved, whereas the input constants are the elliptic curve parameter a used for point doubling in Algorithm 2, as well as the constant 1 used for point addition in mixed coordinates in Algorithm 1 (only in the first iteration of the double-and-add and double-and-add-or-subtract algorithms, when Q=O). Thus, the constants R mod p and aR mod p should be computed in advance.

In the embodiment where the inversion operation required for the conversion of the final result of the scalar multiplication from projective to affine coordinates is implemented as exponentiation, $z^{-1} = z^{p-2}$, and where all the operations of multiplication, addition, and subtraction are performed in the Montgomery domain by using the algorithms discussed in the foregoing, the conversion of the final x and y coordinates from the Montgomery into integer domain can be automatically achieved if the z coordinate, after the inversion, is converted from the Montgomery into the integer form, and then multiplied with the x and y coordinates for the conversion into affine coordinates by using the algorithm above. This is a consequence of $(x \cdot R) \cdot (z^{-1}) \cdot R^{-1} = x \cdot z^{-1}$ and $(y \cdot R) \cdot (z^{-1}) \cdot R^{-1} = y \cdot z^{-1}$.

The inversion algorithm implemented by the square-and-multiply exponentiation algorithm in the left-to-right form is shown below:

| Modular inversion - Montgomery exponentiation, square-and-multiply, left-to-right | |
|---|---|
| Input: | $p = (p_{m-1}, p_{m-2}, \ldots, p_1, p_0)_2$, $p_{m-1} = p_0 = 1$ |
| | $x_M = x \cdot R \bmod p$, $x = (x_{m-1}, x_{m-2}, \ldots, x_1, x_0)_2$, $0 < x \leq p - 1$ |
| | $k = (k_{m-1}, k_{m-2}, \ldots, k_1, k_0)_2 = p - 2$ |
| | $R = 2^m$ |
| | R mod p |
| Output: | $z = (z_{m-1}, z_{m-2}, \ldots, z_1, z_0)_2 = x^{-1} \bmod p$ |
| Auxiliary variables: | $z = (z_m, z_{m-1}, z_{m-2}, \ldots, z_1, z_0)_2$ |
| $z \leftarrow R \bmod p$ | |
| for i from m - 1 down to 0 | |
|   $z \leftarrow z \cdot_M z$ | |
|   if $k_i = 1$ then $z \leftarrow z \cdot_M x_M$ | |
| $z \leftarrow z \cdot_M 1$ | |

The constant R mod p, which has to be computed in advance, is the Montgomery form of the constant 1, which is needed as the initial value of the coordinate z in the square-and-multiply algorithm. It is assumed that the input x is already available in the Montgomery form, as discussed above. The final step is the conversion from the Montgomery into integer form of the final result, which is then equal to $x^{-1} \bmod p$ instead of $x^{-1} \cdot R \bmod p$. If $x_M$ is taken as the input to the algorithm, then the output is equal to $x_M^{-1} \cdot R \bmod p$, so that it outputs the inverse in the Montgomery form of the input in the integer form. This can be used in the ECDSA protocol for digital signatures, where the modulus is the (prime) order of the base point.

Since the square-and-multiply exponentiation algorithm contains a series of squaring operations and multiplications not interrupted by additions or subtractions, one can also use the same algorithm, but with a simplified binary Montgomery multiplication algorithm in such a way that the final three steps, performing the modular reduction if $p \leq z < 2p$, are not performed at all at the expense of using another, somewhat larger constant $R = 2^{m+2}$ and doing two further iterations, where the operands are allowed to be 1 bit longer, that is, in the range $0 \leq x, y \leq 2p$. The output of the simplified binary Montgomery multiplication algorithm is bound to satisfy $0 \leq z < 2p$, whereas the final conversion into the Montgomery form automatically ensures that $0 \leq z < p$.

Thanks to the present invention, which allows balancing the algorithms for point addition and doubling, the double-and-add algorithm widely used in practical implementations of ECCs for the operations of scalar multiplication is rendered strong against side-channel attacks such as the timing attack and the SPA attack. However, there may be a risk of the leakage of the total number of 1's in the binary representation (i.e., the Hamming weight) of the scalar k.

According to an embodiment of the present invention, in order to practically eliminate the leakage of the scalar Hamming weight in the double-and-add algorithm, as well as to achieve a practical resistance against the DPA attacks, the use of the balanced point addition and point doubling algorithms may be combined with the scalar randomization, with the random number being 32 to 128 bits long, depending on the desired security level.

In particular, the scalar k may be randomized by adding thereto a random integer multiple of the order n of the base point P according to $k \leftarrow k+rn$, in view of $kP = kP + rnP = (k+rn)P$, because of $nP = O$. In the cryptographic protocols such as ECDH and ECDSA, the bit sizes of p, n, and k are all almost the same. The random number r is preferably from 32 to 128 bits long, depending on the desired security level, thus not degrading the performance significantly. This scalar randomization practically eliminates the leakage of the scalar Hamming weight in the double-and-add type of algorithm as well as provides a practical resistance against the DPA attacks. It is pointed out even with the randomization of the scalar, it is possible to guarantee that in each iteration of the, e.g., double-and-add algorithm it is true that $Q \neq P$ (so that the addition of different points is performed after the point doubling) provided that k<n and the difference of the bit lengths of k and r is greater than 2. Furthermore, if k<n and the difference of the bit lengths of k and r is greater than 0, then, except in the initial iteration, the condition $Q = O$ may not happen during the further iterations of the algorithm.

An ECC may be implemented by an integrated circuit chip, which in turn can be embedded in a smart card or any other portable support like a USB key.

Figure 3:
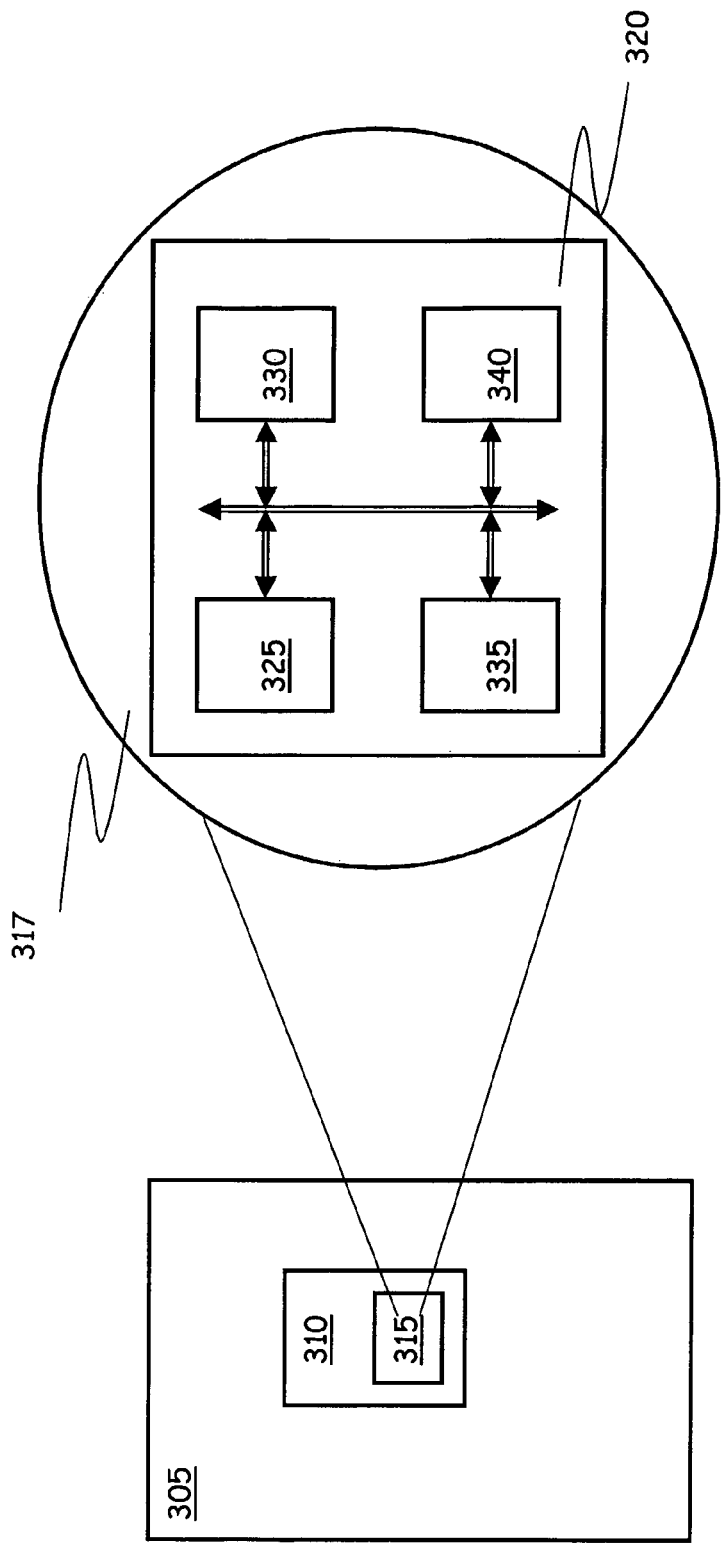
FIG. 3 shows a communication device configured to implement the encryption technique of the present invention.

For example, in FIG. 3 a possible application of the present invention is pictorially shown; reference numeral 305 denotes a user device, like for example a cellular phone, e.g., a UMTS phone; the phone 305 operates based on a Subscriber Identify Module (SIM) card 310, which is a smart card with an embedded IC chip 315. The IC chip 315 implements, among other functions, a cryptosystem, particularly an ECC, denoted as a whole 317, e.g., an ECDH or an ECDSA. The ECC 317 includes a scalar multiplication unit 320, adapted to perform multiplications of data represented as elliptic curve points by a scalar k, for example, a secret encryption key. The scalar multiplication unit 320 includes in particular four interconnected sub-units: a point addition unit 325, a point doubling unit 330, a field arithmetic unit 335, adapted to perform elementary arithmetic operations in the prime field, and a control unit 340, supervising the operation of the scalar multiplication unit.

The present invention was disclosed by means of some exemplary embodiments thereof, however those skilled in the art, in order to satisfy contingent needs, will readily devise modifications to the described embodiments, as well as alternative embodiments, without for this reason departing from the protection scope defined in the appended claims.

The invention claimed is:

1. A method, implemented by an integrated circuit (IC), for transforming data with a secret parameter in an elliptic curve cryptosystem based on an elliptic curve defined over an underlying prime field, comprising:

multiplying, by the IC, a point of the elliptic curve, the point representing the data to be transformed, by a scalar representing the secret parameter, wherein the multiplying comprises performing at least one point addition operation and at least one point doubling operation on points of the elliptic curve, wherein the scalar is randomized by introducing thereto a random number, and a difference between the bit lengths of the scalar and the random number being greater than 2;

providing, by the IC, a first representation, in affine coordinates, of the point of the elliptic curve to be multiplied and a second representation, in projective coordinates, of intermediate elliptic curve points obtained during the multiplying step; and performing, by the IC, the point addition operation in mixed coordinates using the first representation of the point of the elliptic curve by means of a first sequence of elementary prime field operations and the point doubling operation in the projective coordinates using the second representation of the intermediate elliptic curve points by means of a second sequence of elementary prime field operations, the first and second sequences having a same number of elementary prime field operations and each elementary prime field operation of the first sequence and a corresponding placed elementary prime field operation of the second sequence are of a same type, the elementary prime field operations of the first and second sequences comprising:

a first type of prime field operations comprising field multiplication and field squaring of coordinates of the points of the elliptic curve; and a second type of prime field operations comprising field addition, field doubling, and field subtraction of coordinates of the points of the elliptic curve, wherein the first sequence of elementary prime field operations comprises at least two operations of the first type and at least two operations of the second type; and wherein:

the field multiplication and the field squaring of coordinates of the points, when executed by the IC, take a same amount of operation time and consume a same amount of power by the IC; and the field addition, the field doubling, and the field subtraction of coordinates of the points, when executed by the IC, take a same amount of operation time and consume a same amount of power by the IC.

2. The method according to claim 1, wherein the first sequence of elementary prime field operations comprises consecutively:

at least two operations of the first type;
at least two operations of the second type;

at least two operations of the first type;
at least one operation of the second type;
at least two operations of the first type;
at least one operation of the second type;
at least one operation of the first type;
at least two operations of the second type;
at least one operation of the first type;
at least three operations of the second type;
at least one operation of the first type;
at least one operation of the second type; and
at least three operations of the first type.

3. The method according to claim 1, wherein the field addition is defined as $z=(x+y) \bmod p$ and is executed on a basis of a modular addition algorithm:

```
z ← x + y
u ← z − p
if u is ≥ 0
    then z ← u
    else z ← z
``` wherein p is a prime number defining the number of elements of the prime field, x and y are the addends, satisfying $0 \leq x, y \leq p-1$, and u is an auxiliary variable.

4. The method according to claim 1, wherein the field subtraction is defined as $z=(x-y) \bmod p$ and is executed on a basis of a modular subtraction algorithm:

```
z ← x − y
u ← z + p
if u ≥ 0
    then z ← u
    else z ← z
``` wherein p is a prime number defining the number of elements of the prime field, x and y are the addends, satisfying $0 \leq x, y \leq p-1$, and u is an auxiliary variable.

5. The method according to claim 2, wherein the field multiplication, defined as $z=(z_{m-1}, z_{m-2}, \ldots, z_1, z_0)_2 = x \cdot y \bmod p$, is executed on a basis of a binary Montgomery multiplication algorithm, which produces an output value equal to $z=(z_{m-1}, z_{m-2}, \ldots, z_1, z_0)_2 = x \cdot y \cdot R^{-1} \bmod p$:

```
z ← 0
for i from 0 to m − 1
    z ← z + x_i · y
    z ← z + z_0 · p
    z ← z / 2
u ← z − p
if u ≥ 0
    then z ← u
    else z ← z
``` wherein m is an integer, p is a prime number defining the number of elements of the prime field, x and y are the factors, satisfying $0 \leq x, y \leq p-1$, $R=2^m$ ($R>p$) is an integer, and z and u are used as auxiliary variables, the prime number p, the factors x and y, and the auxiliary variables z and u being expressed in the binary form as $p=(p_{m-1}, p_{m-2}, \ldots, p_1, p_0)_2, \ldots, p_{m-1}=p_0=1, x=(x_{m-1}, x_{m-2}, \ldots, x_1, x_0)_2, y=(y_{m-1}, y_{m-2}, \ldots, y_1, y_0)_2, z=(z_m, z_{m-1}, z_{m-2}, \ldots, z_1, z_0)_2$, and $u=(u_m, u_{m-1}, u_{m-2}, \ldots, u_1, u_0)_2$.

6. The method according to claim 5, further comprising:
transforming coordinates of the points from an integer form into a Montgomery form defined as $x_m = x \cdot R \bmod p$ and $y_m = y \cdot R \bmod p$, wherein $R=2^m$ is an integer; and
performing prime field operations on the transformed coordinates, thus preserving results in the Montgomery form.

7. The method according to claim 6, further comprising retransforming the coordinates of the points from the Montgomery form into the integer form.

8. The method according to claim 1, wherein providing the second representation, in projective coordinates, of the intermediate elliptic curve points comprises:
providing a representation of the intermediate elliptic curve points in affine coordinates; and
converting the representation of the intermediate elliptic curve points in affine coordinates from affine into projective coordinates.

9. The method according to claim 8, comprising converting a representation of a resultant elliptic curve point resulting from the multiplying the point of the elliptic curve by the scalar, from projective into affine coordinates.

10. The method according to claim 9, wherein the converting the representation of the resultant elliptic curve point comprises performing a field inversion, the field inversion being defined as $z=(z_{m-1}, z_{m-2}, \ldots, z_1, z_0)_2 = x^{-1} \bmod p$ and being performed by means of a square-and-multiply Montgomery exponentiation algorithm:

```
z ← R mod p
for i from m − 1 down to 0
    z ← z ·_M z
    if k_i = 1 then z ← z ·_M x_M
z ← z ·_M 1
``` wherein m is an integer, p is a prime number defining the number of elements of the prime field, x is the number to be inverted, satisfying $0 \leq x \leq p-1$ and given as input in a Montgomery form $x_M = R \bmod p$, $R=2^m$ ($R>p$) is an integer, $k=p-2$, and z is used as an auxiliary variable, the prime number p, the numbers x, k, and the auxiliary variable z all being expressed in the binary form as $p=(p_{m-1}, p_{m-2}, \ldots, p_1, p_0)_2, p_{m-1}=p_0=1, x=(x_{m-1}, x_{m-2}, \ldots, x_1, x_0)_2, k=(k_{m-1}, k_{m-2}, \ldots, k_1, k_0)_2$, and $z=(z_m, z_{m-1}, z_{m-2}, \ldots, z_1, z_0)_2$.

11. The method according to claim 10, further comprising:
performing the Montgomery exponentiation algorithm on the z projective coordinate of the elliptic curve point given in the Montgomery form; and
multiplying the result by the x and y projective coordinates of the elliptic curve point given in the Montgomery form by using the binary Montgomery multiplication algorithm, respectively, thus converting back the representation of the elliptic curve point into affine coordinates given in the integer form.

12. The method according to claim 1, wherein the multiplying a point of the elliptic curve by a scalar is performed based on at least one of a double-and-add algorithm or a double-add-and-subtract algorithm.

13. A device for transforming data with a secret parameter in an elliptic curve cryptosystem based on an elliptic curve defined over an underlying prime field, comprising an integrated circuit to:
multiply a point of the elliptic curve, the point representing the data to be transformed, by a scalar representing the secret parameter, wherein the multiplying comprises performing at least one point addition operation and at least one point doubling operation on points of the elliptic curve, wherein the scalar is randomized by introducing thereto a random number, and a difference between the bit lengths of the scalar and the random number being greater than 2;

provide a first representation, in affine coordinates, of the point of the elliptic curve to be multiplied and a second representation, in projective coordinates, of intermediate elliptic curve points obtained during the multiplying step; and perform the point addition operation in mixed coordinates using the first representation of the point of the elliptic curve by means of a first sequence of elementary prime field operations and the point doubling operation in the projective coordinates using the second representation of the intermediate elliptic curve points by means of a second sequence of elementary prime field operations, the first and second sequences having a same number of elementary prime field operations and each elementary prime field operation of the first sequence and a corresponding placed elementary prime field operation of the second sequence are of a same type, the elementary prime field operations of the first and second sequences comprising:

a first type of prime field operations comprising field multiplication and field squaring of coordinates of the points of the elliptic curve; and a second type of prime field operations comprising field addition, field doubling, and field subtraction of coordinates of the points of the elliptic curve, wherein the first sequence of elementary prime field operations comprises at least two operations of the first type and at least two operations of the second type; and wherein:

the field multiplication and the field squaring of coordinates of the points, when executed by the IC, take a same amount of operation time and consume a same amount of power by the IC; and the field addition, the field doubling, and the field subtraction of coordinates of the points, when executed by the IC, take a same amount of operation time and consume a same amount of power by the IC.

14. The device according to claim 13, wherein the integrated circuit is embedded in a portable device or a smart card.

\* \* \* \* \*